(12) United States Patent
Henderson

(10) Patent No.: US 6,427,064 B1
(45) Date of Patent: *Jul. 30, 2002

(54) METHOD AND APPARATUS FOR MAINTAINING A DATABASE IN A PORTABLE COMMUNICATION DEVICE

(76) Inventor: Daniel A. Henderson, 33300 Mission Blvd. #131, Union City, CA (US) 94587

( * ) Notice: Subject to any disclaimer, the term of this patent is extended or adjusted under 35 U.S.C. 154(b) by 0 days.

This patent is subject to a terminal disclaimer.

(21) Appl. No.: 08/177,850

(22) Filed: Jan. 5, 1994

(51) Int. Cl.[7] .............................. H04Q 7/00; G08B 5/22
(52) U.S. Cl. ............................... 455/31.1; 340/825.27; 340/825.44
(58) Field of Search ............... 379/57, 355; 340/825.44, 340/825.27; 455/31.1

(56) References Cited

U.S. PATENT DOCUMENTS

| | | | |
|---|---|---|---|
| 4,065,642 A | 12/1977 | McClure | 179/18 B |
| 4,072,824 A | 2/1978 | Phillips | 179/18 B |
| 4,087,638 A | 5/1978 | Hayes et al. | 179/2 |
| 4,103,107 A | 7/1978 | D'Amico et al. | 179/2 |
| 4,117,542 A | 9/1978 | Klausner et al. | 364/900 |
| 4,126,768 A | 11/1978 | Grenzow | 179/90 |
| 4,172,969 A | 10/1979 | Levine et al. | 179/2 EC |
| 4,178,475 A | 12/1979 | Taylor et al. | 179/2 EC |
| 4,178,476 A | 12/1979 | Frost | 179/2 EC |
| 4,263,480 A | 4/1981 | Levine | 179/2 EC |
| 4,266,098 A | 5/1981 | Novak | 179/5.5 |
| 4,304,968 A | 12/1981 | Klausner et al. | 179/6.02 |
| 4,313,035 A | 1/1982 | Jordan et al. | 179/18 BE |
| 4,336,524 A | 6/1982 | Levine | 340/311.1 |
| 4,356,519 A | 10/1982 | Cogdell, Jr. | 360/61 |
| 4,368,989 A | 1/1983 | Kawashima | 368/74 |
| 4,378,551 A | 3/1983 | Drapac | 340/311.1 |
| 4,388,000 A | 6/1983 | Hagihara | 368/72 |
| 4,408,099 A | 10/1983 | Ishii | 179/2 EC |
| 4,424,514 A | 1/1984 | Fennell et al. | 340/825.52 |
| 4,427,848 A | 1/1984 | Tsakanikas | 179/2 DP |
| 4,427,980 A | 1/1984 | Fennell et al. | 340/825.52 |
| 4,438,433 A | 3/1984 | Smoot et al. | 340/825.44 |
| 4,477,807 A | 10/1984 | Nakajima et al. | 340/825.44 |
| 4,490,579 A | 12/1984 | Godoshian | 179/2 EC |
| 4,600,809 A | 7/1986 | Tatsumi et al. | 179/2 EA |
| 4,608,460 A | 8/1986 | Carter et al. | 379/6.11 |
| 4,618,860 A | 10/1986 | Mori | 340/825.44 |
| 4,625,081 A | 11/1986 | Lotito et al. | 379/88 |
| 4,639,225 A | 1/1987 | Washizuka | 434/308 |
| 4,644,351 A | 2/1987 | Zabarky et al. | 340/825.44 |
| 4,654,718 A | 3/1987 | Sueyoshi | 358/257 |

(List continued on next page.)

FOREIGN PATENT DOCUMENTS

| | | | |
|---|---|---|---|
| DE | 3315625 | 10/1984 | 379/58 |
| DE | 3329267 | 2/1985 | 379/58 |
| DE | 3421886 | 12/1985 | H04M/1/00 |
| EP | 0 212 761 | 8/1986 | H04Q/7/04 |

(List continued on next page.)

OTHER PUBLICATIONS

Messaging: A New Direction—Awash in E–Mail troubles? A Raft Of New Products Is Coming To The Rescue., Network Computing, Oct. 1, 1996, p. 58.
IdentaFone overview from website dated Oct. 17, 1996.
NetPAGE product overview.

(List continued on next page.)

*Primary Examiner*—Edward L. Coles, Sr.
*Assistant Examiner*—Fan Lee

(57) ABSTRACT

A method and apparatus is described for the communication of data which is maintained in a database within a memory of a paging receiver. The data maintained in these fields may be utilized during page requests to provide possibly useful information to the page-receiving communicant. The data is communicated via one or more alternative techniques described herein.

21 Claims, 23 Drawing Sheets

U.S. PATENT DOCUMENTS

| | | | |
|---|---|---|---|
| 4,661,972 A | 4/1987 | Kai | 379/57 |
| 4,680,785 A | 7/1987 | Akiyama et al. | 379/57 |
| 4,682,148 A | 7/1987 | Ichikawa et al. | 340/311.1 |
| 4,692,742 A | 9/1987 | Raizen et al. | 340/539 |
| 4,704,608 A | 11/1987 | Sato et al. | 340/825.44 |
| 4,706,272 A | 11/1987 | Nishimura et al. | 379/57 |
| 4,713,808 A | 12/1987 | Gaskill et al. | 370/94 |
| 4,716,583 A | 12/1987 | Groner et al. | 379/88 |
| 4,720,848 A | 1/1988 | Akiyama | 379/88 |
| 4,737,979 A | 4/1988 | Hashimoto | 379/82 |
| 4,742,516 A | 5/1988 | Yamaguchi | 370/94 |
| 4,747,122 A | 5/1988 | Bhagat et al. | 379/57 |
| 4,754,473 A | 6/1988 | Edwards | 379/58 |
| 4,766,434 A | 8/1988 | Matai et al. | 340/825.44 |
| 4,775,999 A | 10/1988 | Williams | 379/59 |
| 4,776,005 A | 10/1988 | Petriccione et al. | 379/142 |
| 4,779,138 A | 10/1988 | Nomura et al. | 358/236 |
| 4,796,291 A | 1/1989 | Makino | 358/58 |
| 4,800,582 A | 1/1989 | D'Agosto, III et al. | 379/216 |
| 4,802,200 A | 1/1989 | Murata et al. | 379/61 |
| 4,803,726 A | 2/1989 | Levine et al. | 380/48 |
| 4,806,906 A | 2/1989 | Oda et al. | 340/311.1 |
| 4,811,379 A | 3/1989 | Grandfield | 379/57 |
| 4,812,743 A | 3/1989 | Champion, III et al. | 340/905 |
| 4,814,763 A | 3/1989 | Nelson et al. | 340/825.44 |
| 4,821,308 A | 4/1989 | Hashimoto | 379/57 |
| 4,868,560 A | 9/1989 | Oliwa et al. | 340/825.44 |
| 4,868,561 A | 9/1989 | Davis | 340/825.44 |
| 4,868,860 A | 9/1989 | Anddros et al. | 379/57 |
| 4,872,005 A | 10/1989 | DeLuca et al. | 340/825.44 |
| 4,873,520 A | 10/1989 | Fisch et al. | 340/825.44 |
| 4,873,719 A | 10/1989 | Reese | 379/215 |
| 4,878,051 A | 10/1989 | Andros et al. | 340/825.44 |
| 4,882,579 A | 11/1989 | Siwiak | 340/825.44 |
| 4,882,744 A | 11/1989 | Hashimoto | 379/57 |
| 4,882,750 A | 11/1989 | Henderson et al. | 379/355 |
| 4,885,577 A | 12/1989 | Nelson | 340/825.44 |
| 4,893,335 A | 1/1990 | Fuller et al. | 379/200 |
| 4,894,835 A * | 1/1990 | Gaskill et al. | 340/825.44 |
| 4,899,358 A | 2/1990 | Blakley | 379/67 |
| 4,914,691 A | 4/1990 | Berger | 379/357 |
| 4,918,721 A | 4/1990 | Hashimoto | 379/96 |
| 4,922,221 A | 5/1990 | Sato et al. | 340/311.1 |
| 4,924,496 A | 5/1990 | Figa et al. | 379/142 |
| 4,940,963 A | 7/1990 | Gutman et al. | 340/313 |
| 4,941,167 A | 7/1990 | Cannalte et al. | 379/67 |
| 4,942,598 A | 7/1990 | Davis | 379/57 |
| 4,951,043 A | 8/1990 | Minami | 340/825.44 |
| 4,961,216 A | 10/1990 | Baehr et al. | 379/57 |
| 4,962,377 A | 10/1990 | Wallace et al. | 340/825.44 |
| 4,965,569 A | 10/1990 | Bennett et al. | |
| 4,975,683 A | 12/1990 | Davis et al. | 340/825.44 |
| 4,975,693 A | 12/1990 | Davis et al. | 340/825.44 |
| 4,985,913 A | 1/1991 | Shalom et al. | 379/76 |
| 4,994,797 A * | 2/1991 | Breeder | 379/57 |
| 4,996,707 A | 2/1991 | O'Malley et al. | 379/100 |
| 5,014,296 A | 5/1991 | Saigano | 379/67 |
| 5,043,721 A | 8/1991 | May | 340/825.44 |
| 5,047,764 A | 9/1991 | Andros et al. | 340/311.1 |
| 5,049,874 A | 9/1991 | Ishida et al. | 340/825.44 |
| 5,063,588 A | 11/1991 | Patsiokas et al. | 379/57 |
| 5,066,949 A | 11/1991 | Breeden et al. | 340/825.44 |
| 5,073,767 A | 12/1991 | Holmes et al. | 340/311.1 |
| 5,075,684 A | 12/1991 | DeLuca | 340/825.44 |
| 5,093,659 A | 3/1992 | Yamada | 340/825.44 |
| 5,095,307 A | 3/1992 | Shimura et al. | 340/825.44 |
| 5,099,507 A | 3/1992 | Mukai et al. | 379/57 |
| 5,117,449 A | 5/1992 | Metroka et al. | 379/58 |
| 5,124,697 A | 6/1992 | Moore | 380/825.44 |
| 5,127,040 A | 6/1992 | D'Avello et al. | 379/58 |
| 5,128,980 A | 7/1992 | Choi | 379/56 |
| 5,128,981 A | 7/1992 | Tsukamoto et al. | 379/58 |
| 5,134,645 A | 7/1992 | Berken et al. | 379/58 |
| 5,144,654 A | 9/1992 | Kelley et al. | 379/356 |
| 5,146,493 A | 9/1992 | Kiguchi et al. | 379/357 |
| 5,148,469 A | 9/1992 | Price | 379/57 |
| 5,148,473 A | 9/1992 | Freeland et al. | 379/59 |
| 5,151,929 A | 9/1992 | Wolf | 379/57 |
| 5,151,930 A | 9/1992 | Hagl | 379/57 |
| 5,153,579 A | 10/1992 | Fisch et al. | 340/825.22 |
| 5,159,624 A | 10/1992 | Makita | 379/57 |
| 5,161,181 A | 11/1992 | Zwick | 379/67 |
| 5,166,973 A | 11/1992 | Hoff | 379/57 |
| 5,175,875 A | 12/1992 | Yokoya et al. | 455/89 |
| 5,182,553 A * | 1/1993 | Kung | 340/825.44 |
| 5,195,130 A | 3/1993 | Weiss et al. | 379/98 |
| 5,206,637 A | 4/1993 | Warren | 340/825.31 |
| 5,208,849 A | 5/1993 | Fu | 379/70 |
| 5,208,850 A | 5/1993 | Kino | 379/88 |
| 5,212,721 A | 5/1993 | DeLuca et al. | 379/57 |
| 5,224,150 A * | 6/1993 | Neustein | 379/57 |
| 5,225,826 A * | 7/1993 | Deluca et al. | |
| 5,228,073 A | 7/1993 | Smith | 379/57 |
| 5,251,250 A * | 10/1993 | Obata et al. | 340/825.44 |
| 5,252,964 A | 10/1993 | Tan et al. | 340/825.48 |
| 5,258,751 A * | 11/1993 | Deluca et al. | 340/825.44 |
| 5,272,465 A | 12/1993 | Meares, Jr. | 340/539 |
| 5,274,454 A | 12/1993 | Higgins, Jr. | 358/186 |
| 5,274,699 A | 12/1993 | Ranz | 379/142 |
| 5,276,731 A | 1/1994 | Arbel et al. | 379/88 |
| 5,278,889 A | 1/1994 | Papanicolaou | 379/53 |
| 5,278,894 A | 1/1994 | Shaw | 379/67 |
| 5,280,516 A | 1/1994 | Jang | 379/57 |
| 5,280,521 A | 1/1994 | Itoh | 379/58 |
| 5,283,818 A | 2/1994 | Klausner et al. | 379/67 |
| 5,283,824 A | 2/1994 | Shaw | 379/142 |
| 5,285,493 A | 2/1994 | Wagai et al. | 379/58 |
| 5,285,496 A | 2/1994 | Frank et al. | 380/9 |
| 5,289,528 A | 2/1994 | Ueno et al. | 379/67 |
| 5,289,530 A | 2/1994 | Reese | 379/88 |
| 5,307,399 A | 4/1994 | Dai et al. | 379/57 |
| 5,311,570 A | 5/1994 | Grimes et al. | 379/57 |
| 5,315,636 A | 5/1994 | Patel | 379/58 |
| 5,315,642 A | 5/1994 | Fernandez | 379/52 |
| 5,317,621 A | 5/1994 | Shibayama | 379/57 |
| 5,321,742 A | 6/1994 | Stevens | 379/103 |
| 5,327,480 A | 7/1994 | Breeden | 379/57 |
| 5,327,486 A | 7/1994 | Wolff et al. | 379/96 |
| 5,329,578 A | 7/1994 | Brennan et al. | 379/67 |
| 5,333,179 A | 7/1994 | Yamamoto et al. | 379/67 |
| 5,341,411 A | 8/1994 | Hashimoto | 379/67 |
| 5,341,414 A | 8/1994 | Popke | 379/142 |
| 5,343,516 A | 8/1994 | Callele et al. | 379/98 |
| 5,349,636 A | 9/1994 | Irrabarren | 379/89 |
| 5,349,638 A | 9/1994 | Pitroda et al. | 379/142 |
| 5,384,831 A | 1/1995 | Creswell et al. | 379/67 |
| 5,388,150 A | 2/1995 | Schneyer et al. | 379/67 |
| 5,390,236 A | 2/1995 | Klausner et al. | 379/67 |
| 5,390,362 A * | 2/1995 | Modjeska et al. | 379/57 |
| 5,392,452 A | 2/1995 | Davis | 455/38.1 |
| 5,402,466 A | 3/1995 | Delahanty | 379/44 |
| 5,404,400 A | 4/1995 | Hamilton | 379/386 |
| 5,412,719 A | 5/1995 | Hamamoto et al. | 380/9 |
| 5,418,835 A | 5/1995 | Frohman et al. | 379/57 |
| 5,426,426 A | 6/1995 | Hymel | 340/825.44 |
| 5,428,823 A | 6/1995 | Ness-Cohn et al. | 455/54.2 |
| 5,430,439 A | 7/1995 | Bodet et al. | 340/825.44 |
| 5,448,627 A | 9/1995 | Ueno et al. | 379/67 |
| 5,448,632 A | 9/1995 | Iyob et al. | 379/201 |
| 5,454,029 A | 9/1995 | Noda | 379/88 |

| | | | | |
|---|---|---|---|---|
| 5,459,458 A | 10/1995 | Richardson et al. | ... | 340/825.52 |
| 5,459,773 A | 10/1995 | Hwang | | 379/57 |
| 5,467,385 A | 11/1995 | Reuben et al. | | 379/67 |
| 5,469,491 A | 11/1995 | Morley, Jr. et al. | | 379/88 |
| 5,473,667 A | 12/1995 | Neustein | | 379/57 |
| 5,475,738 A | 12/1995 | Penzias | | 379/67 |
| 5,483,580 A | 1/1996 | Brandman et al. | | 379/88 |
| 5,502,761 A | 3/1996 | Duncan et al. | | 379/142 |
| 5,506,891 A | 4/1996 | Brown | | 379/97 |
| 5,509,053 A | 4/1996 | Gowda et al. | | 379/63 |
| 5,517,557 A | 5/1996 | Tanaka | | 379/67 |
| 5,524,137 A | 6/1996 | Rhee | | 379/67 |
| 5,524,140 A | 6/1996 | Klausner et al. | | 379/67 |
| 5,530,740 A | 6/1996 | Irribarren et al. | | 379/89 |
| 5,533,095 A | 7/1996 | Kikuchi | | 379/57 |
| 5,535,257 A | 7/1996 | Goldberg et al. | | 379/57 |
| 5,546,447 A | 8/1996 | Skarbo et al. | | 379/142 |
| 5,548,636 A | 8/1996 | Bannister et al. | | 379/201 |
| 5,548,814 A | 8/1996 | Lorang et al. | | 455/38.1 |
| 5,557,605 A | 9/1996 | Grupe et al. | | 370/29 |
| 5,559,859 A | 9/1996 | Dai et al. | | 379/51 |
| 5,561,702 A | 10/1996 | Lipp et al. | | 379/57 |
| 5,572,576 A | 11/1996 | Klausner et al. | | 379/67 |
| 5,579,377 A | 11/1996 | Rogers | | 379/74 |
| 5,581,594 A | 12/1996 | McAfee | | 379/57 |
| 5,581,803 A | 12/1996 | Grube et al. | | 455/54.1 |
| 5,588,037 A | 12/1996 | Fuller et al. | | 379/57 |

FOREIGN PATENT DOCUMENTS

| | | | |
|---|---|---|---|
| EP | 301740 | 2/1989 | 379/58 |
| EP | 9203891 | 3/1992 | H04Q/7/04 |
| FR | 2358065 | 2/1978 | 379/170 |
| GB | 2024567 | 5/1979 | H04Q/7/02 |
| GB | 2140253 A | 11/1984 | H04Q/7/04 |
| GB | 2173071 | 10/1986 | 379/57 |
| JP | 146167 | 8/1983 | 379/67 |
| JP | 191541 | 11/1983 | 379/58 |
| JP | 58191541 | 11/1983 | |
| JP | 90451 | 5/1984 | 379/89 |
| JP | 41358 | 3/1985 | 379/142 |
| JP | 77539 | 5/1985 | 379/58 |
| JP | 94547 | 5/1985 | 379/58 |
| JP | 178730 | 9/1985 | |
| JP | 187141 | 9/1985 | 379/57 |
| JP | 186056 | 8/1986 | 379/57 |
| JP | 81821 | 4/1987 | 379/58 |
| JP | 8706421 | 10/1987 | 379/142 |
| JP | 65748 | 3/1988 | 379/142 |
| JP | 103526 | 5/1988 | 379/57 |
| JP | 46332 | 2/1989 | 379/58 |
| JP | 185035 | 7/1989 | 455/18 |
| JP | 246947 | 10/1989 | 379/170 |
| JP | 13050 | 1/1990 | 379/57 |
| JP | 4225687 | 8/1992 | H04Q/7/04 |

OTHER PUBLICATIONS

HP TeleShare: Integrating telephone capabilities on a computer workstation, Hewlett Packard Journal, Apr. 1, 1995, p. 69.
Hayes Europe's Smartcom Message Center Software, Newbytes News Network, Feb. 29, 1996.
AT & T Makes Big Movie in Digital Race, Los Angeles Times, Oct. 3, 1996, p. D–2.
Faster Units Due in Stores Next Year, Computer Retail Week, Oct. 14, 1996, p. 33.
CDMA's March Continues, Newsbytes News Network, Aug. 19, 1996.
AT & T First To Offer PCS Phones/New System bundles several wireless Servicesl, Newsday, Oct. 3, 1996, p. A49.
Diamond Ships Voice Modem With Internet Phone., Newsbytes News Network, May 18, 1995.
Fax Software: Delrina Demos WinFax Pro 7.0 For Windows 95; Cambridge Publishing, 1995.
New Modems: New Cardinal Voice–Capable Modems Offer Innovative Telephony; Cambridge Publishing, Inc. 1995.
Toward Human Centered Design. vol. 96, Technology Review, Jul. 1, 1993, p. 47.
How the Europeans respond to Mobile communications., vol. 31, Communications News, May 1, 1994, p. 28.
Users seek alternatives to high cellular costs., vol. 12, Minneapolis–St. Paul City Business, Jun. 17, 1994, p. 14.
Voicenow Is Hip–pocket Answering Machine. USA Today, Apr. 5, 1995.
Multimedia Messaging: AT & T Integrates Voice & Fax Messaging At Desktop. Cambridge Telecom Report, 1994.
CID Technologies and Macpager information.
OPON: MCI To Provide Nationwide 'Find Me/Follow Me' Communications Service., Cambridge Publishing Inc., 1994.
Private EyeD—MartyrWare Private Eye, v. 1.1, product overview, 1994.
Little Brother pager notification program with caller id, product overview, ©1991–1994.
CallerID Remote and CIDMan v. 1.29b, product overview, 1995.
CALLINFO: v1.0 Caller ID TSR Program product description, Oct. 28, 1994.
PageMate: v3.3 product overview, Apr. 30, 1993.
CALLLINK: v2.1 Caller ID for Windows Demo, May 17, 1994.
Page on Call, v2.1, PC program overview, Jan. 28, 1994.
BeepMe v3.1, PC program overview, Aug. 22, 1993.
"Magic Cap Means Communication" brochure—1994.
"Magic Cap" Brochure—1994.
Mobile Office—Jan., 1994, vol. 5, No. 1, pp. 100–117, "Trio of Tomorrow" article, back cover, Evtek Corporation product advertisement, The Write Touch.
PC LapTop Magazine, Feb. 1995, vol. 7, No. 2, pp. 28–48.
It's NEW, May/Jun. 1995, vol. 1, No. 2, pp. 73–77.
NTT DoCoMo Brochure, Apr. 1, 1995.
Pen Computing Magazine, Aug. 1994, vol. 1, No. 1, pp. 15–22, 34–35.
PC Pager Advertisement—1993.
Computerworld, Dec. 21, 1992, p. 8, "Windows link to pagers aids LAN troubleshooters".
Computer World, Aug. 2, 1993, vol. 15,Issue 31, p.1, "Newton arrives sans remote links".
Magic Cap Press Release, San Francisco, Jan. 6, 1994.
Comdial Tracker brochure, 1994.
Motorola Press Release, PCMCIA wireless modem technology announcement.
Hewlett Packard Press Release, Infrared communications interface announcement, Jun. 1, 1993.
Skytel Press Release—Jan. 6, 1994, "Skytel Corp. and General Magic work together to provide wireless mobile communications".
Newton Message Pad 120, product brochure—1994.
PC Magazine, Aug. 1993, "EO Falls Short As Ultimate Handheld Communicator".
T.A.V.I.S. Talk Product Brochure, Biztel Communication Systems, Inc.
VS–401 TALKS SB product brochure.

Mobile Office Magazine, Jan. 1994, p. 76, Fujitsu PCX numeric answering machine.
PC World, Dec. 1992, Mobile Computing Section, pp. 239–265, "Nomads of the Nineties".
Mobile Data Report, Feb. 1, 1994 v6 12, Apple, Mobilecomm offer Newton, Pager Card, airtime deal.
PC Week, May 23, 1994 v11 n20 pA1(2), A paging party. (growing trend towards one–way messaging).
Teledynamics Catalog, Sep., 1994—Fans P161P Telesecretary Paging Device, pp. 25, 49, 51.
General Magic Press Release, Feb. 8, 1993.
Positive Communications "BEEPER" brochure, 1993.
WinID Paging System—Software manual—v. 1.0, Nov. 15, 1994.
AT & T EO 440 & 880 Personal Communicators brochure, 1993.
PC Week, Feb. 12, 1990, They're Here: Portable E–Mail and Voice Mail.
Ultravoice product brochure.
TeleLink DS5000 advertisement—1993.
PC Magazine, Jun. 15, 1993, "HP 100 LX Adds Remote E–Mail".
INFOWORLD, Jun. 7, 1993, p. 34, "Omron readies PDA for release".
INFOWORLD, Mar. 22, 1993, p. 4, "A failure to communicate: the long road to phone, PC integration".
INFOWORLD, Feb. 22, 1993, p. 29, "Today's notebooks to gain telephony".
INFOWORLD, Apr. 19, 1993, p. 1, "Microsoft, Intel team up to integrate phones, Pcs".
INFOWORLD, Jun. 14, 1993, p. 30, "Third parties to enhance OmniBook 300's communications".
INFOWORLD, Jun. 7, 1993, p. 43, "Card is all–in–one messenger".
INFOWORLD, Jun. 7, 1993, p. 3, "Alliances give Newton PDA a communications advantage".
MacWeek, Aug. 2, 1993, pp. 63–68, "The MessagePad: Apple's first personal digital assistant".
INFOWORLD, Jun. 28, 1993, p. 1, "General Magic's PDA interface comes to life with realistic objects".
PC Magazine, Aug. 1993, p. 359–384, "Connecting Over the Airwaves".
Electronic News, Sep. 28, 1992, p. 11, "Motorola has dual mode RF modem".
Computer Retail Week, Nov. 16, 1992, p. 56, "Wireless messaging gets Windows version".
Business Week, May 17, 1993, Electronic Messages from Phones, PC's, even Faxes.
Telecomworldwire, Aug. 23, 1994, "Airnote pager filter to ship in North America".
Telecomworldwire, Jun. 28, 1994, "Singtel adds pager into CT2 Phone Service".
Global Communications, Sep.–Oct. 1992, v14 n5, p. 14, "Paging Taiwan".
PC Week, Oct. 24, 1994 v11 n42 p109, "Voice of the Future".
Motorola product brochure, "Macro Wireless Communicator", 1994.
Vomax 2000 product brochure, 1992.
PC WORLD, Feb. 1993, "TyIN 2000 Communications System Ties Data, Fax, and Voice together".
TyIN 2000 product brochure, 1993.
Nicollet DigiTrap DTS–2040 product brochure, 1994.
Nicollet DigiTrap DTS–1082 product brochure, 1994.

Telocator Network Paging Protocol (TNPP), v. 3.6, Oct. 20, 1993.
Telocator Data Protocol (TDP), Jun. 12, 1993.
Telocator Alpanumeric Protocol (TAP), v. 1.5, Jul. 21, 1994.
Psion Series 3 Personal Information Management product brochure, Sep. 1993.
Pagentry product brochure, 1992.
Byte Magazine, Aug. 1994, p34, "IBM Plans Ambitious Network".
Windows Sources, Apr. 1994, pp. 106–138.
San Francisco Examiner, Aug. 1, 1993, p E16, "Newton arriving at last".
Bellcore LSSGR ANI and ONI—FDS 20–20–0000, Issue 2, Mar. 1991.
Bellcore LSSGR TR–NWT–000030 Issue 2, Oct. 1992.
Bellcore LSSGR TR–NWT–000391, Issue 3, Sep. 1992.
Bellcore LATA TR–NWT–000031, Issue 4, Dec. 1992.
Motorola SiteMate product brochure—on–site paging system.
Telecomworldwire, May 31, 1994, "IBM, Paclink launch new pager in Thailand".
Newsbytes News Network, Apr. 11, 1994, "PageNet, Motorola work on advanced pager".
Newsbytes News Network, Mar. 2, 1994, "PCMCIA Card combines wireless pager/wired fax modem".
Newsbytes News Network, Dec. 21, 1993, PageCard to double as PCMCCard/Standalone pager.
Computergram International, Dec. 20, 1993, 12322, "Motorola unveils the memo express pager".
Newbytes News Network, Dec. 22, 1993, Japan—AT & T intros videophone, Motorola plans voice pager.
Edge, Nov. 14, 1994, v9 1329, "Paging: Lotus ships notes pager gateway 1.1 gateway supports multiple paging vendors".
Telecommunications (TL), Report on AT & T, Nov. 21, 1994 v12 123, "AT & T Focuses on regular text messaging as pager money–maker".
Telecomworldwire, Oct. 7, 1994, "NEC introduces super 'Know–everything' pager into UK Market".
HFD– The Weekly Home Furnishings Newspaper, Jan. 31, 1994 v68 n5 p92.
Satellite Communications, Sep. 1992 v16 n9 p29(4).
PageMaster paging application—Software help manual—v. 1.4, 1995.
Executive Page v. 1.2—Software manual—1993, 1994.
CALLLink for Caller ID v. 2.1—Software manual—Digital Systems Group, Inc., 1994.
The Business Journal, Oct. 14, 1994 v14 n50 p27, "Wireless message pad among new products".
Communications Daily, Jan. 30, 1991 v11 n20 p5.
PC Week, Sep. 20, 1993 v10 n37 p41.
Communications International, Jul. 1994 v21 n7 p16(2).
InfoRad AlphaPage software advertisement, Dec. 1992.
Mobile Data Report, Sep. 26, 1994, v6 l19, "Casio introduces nationwide availability of organizer–pager".
PC Laptop Compters Magazine, Apr. 1993, vol. 5, No. 4, pp. 31, 61–63.
Motorola brochure, "Wrist Watch Pager", 1990.
Communications Daily, Mar. 8, 1994 v14 n45, p3.
Radio, Computer & Telephone Corp. PocketOffice brochure, v. 1.0, Jun., 1993.
BellSouth Simon product brochure, 1994.

* cited by examiner

| MESSAGE CODE NO. | TEXTUAL MESSAGE |
|---|---|
| * 1 | CALL WHEN YOU RETURN |
| * 2 | VOICE MAIL RECEIVED |
| * 3 | FAX MAIL RECEIVED |
| * 4 | ELECTRONIC MAIL RECEIVED |
| * 5 | IMAGE DATA RECEIVED |
| * 6 | OTHER DATA RECEIVED |
| * 911 | CALL IMMEDIATELY |
| . | |
| . | |
| . | |

FIG. 5

| | CALLER LOCATION DATA | (Numeric Caller ID Data from Tel. Co.) | CALLER IDENTIFICATION DATA (DTMF ENTRY BY CALLER) | CALLER MESSAGE CODE (DTMF ENTRY) |
|---|---|---|---|---|
| 1 | | | | |
| 2 | NNNNN... | | ABC... | NN |
| | MMMMM... | | DEF | MM |
| ≈ | ≈ | | ≈ | ≈ |
| 49 | XXXX... | | LMN... | Z1 |
| 50 | KKKK... | | WXY... | 02 |

FIG. 6

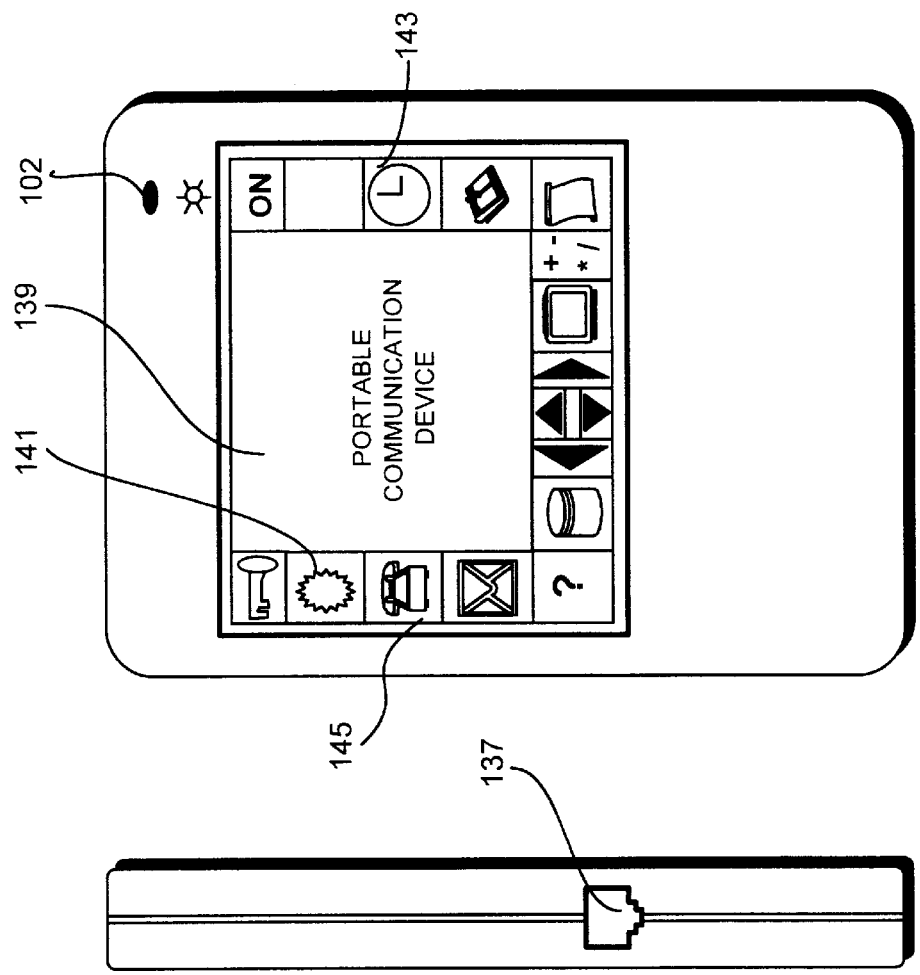
FIG. 9c
FIG. 9b
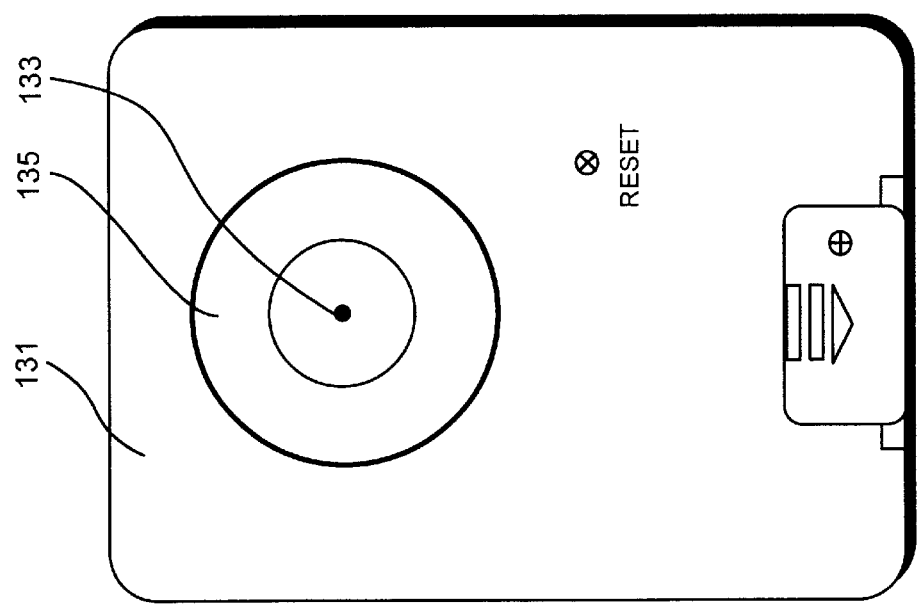
FIG 9a

| | TEL. NO. | FAX NO. | NAME | OTHER DATA | NT |
|---|---|---|---|---|---|
| 1 | 1-415-555-1212 | 1-415-555-2121 | KAZUO HASHIMOTO | 123 ANYWHERE ST., SAN FRANCISCO, CA | VI |
| 2 | 1-503-777-8889 | 1-503-777-8889 | ABC COMPANY | 1 TEST PLAZA, PORTLAND, OR | BL |
| 3 | 1-415-541-0500 | 1-510-444-1212 | ZYZ INC. | 8 WAY, SAN FRANCISCO, CA | T |
| ⋮ 50 | | | | | |

FIG. 12

MESSAGE CODE AND
OTHER USER DATA
INPUT PROCESS

SAMPLE ENTRY

| MESSAGE CODE | (PLEASE PRINT) |
|---|---|
| 11 | P I C K   U P   T H E   K I D S |
| 12 | |
| ⋮ | ⋮ |

| PHONE DATA | | | | | | | NAME DATA |
|---|---|---|---|---|---|---|---|
| 5 | 5 | 5 | 1 | 2 | 1 | 2 | JOHN SMITH |
| 5 | 5 | 5 | 1 | 3 | 1 | 3 | JOHN SMITH - FAX |
| ⋮ | | | | | | | ⋮ |

SAMPLE ENTRY

MANUAL USER DATA ENTRY FORM

FIG. 23

METHOD AND APPARATUS FOR MAINTAINING A DATABASE IN A PORTABLE COMMUNICATION DEVICE

BACKGROUND OF THE INVENTION

1. Field of the Invention

The present invention relates in general to paging networks, and in particular to techniques for constructing and maintaining databases within portable communication devices such as, in particular, a paging receiver.

2. Description of the Prior Art

A present, paging networks allow for a limited amount of numeric or alphanumeric data to be exchanged between a page-originating communicant and a page-receiving communicant. Frequently, the page-originating communicant utilizes a telephone which has a number which is not familiar to the page-receiving communicant. The page is transmitted in the form of a page announce, and numeric or alphanumeric data which is displayed on the display of the portable paging device. Under these circumstances, the page-receiving communicant is unable to ascertain the identity of the page-originating communicant.

This situation is undesirable, since the page-receiving communicant may ignore or defer returning the telephone call, under the mistaken belief that the page-originating communicant is an unknown entity. This presents problems for paging networks, particularly paging networks which include the transmission of only numeric data.

SUMMARY OF THE INVENTION

It is one objective of the present invention to provide a paging device which includes a database with a plurality of fields which identify information pertaining to particular potential communicants. For example, such information may include communicant's telephone numbers, communicant's fax numbers, communicant's addresses, as well as any associated notification information which determines the type of page announce provided to the page-receiving communicant upon receipt of the page. In accordance with the present invention, caller identification information is transferred from a telephone network which is utilized to communicate with paging center, automatically, and is forwarded via the radio frequency communication link to the portable communication device. At least one of the numeric data and/or alphanumeric data in the caller identification information is analyzed and compared with data maintained within the fields of the plurality of fields of the database. Either the caller identification information or page-requesting communicant inputted information is utilized to provide some type of identification of the potential communicant. Identifying information may be withdrawn or derived from the data in the plurality of fields, and/or the data communicated with the page request, in a manner which communicates useful information to the page-receiving communicant.

In accordance with the present invention, the database maintained within the paging receiver must be intermittently or periodically updated, modified, or refreshed in a manner which maintains accurate and current data which can be utilized to generate one or more displays to identify a potential communicant. Data is communicated either via a serial or parallel hardwire link, an infrared communication linkage, or a radio frequency communication linkage. In one particular embodiment, a plurality of communicant cards are produced and distributed to allow potential communications to identify their telephone numbers, names, and addresses, as well as any particular alphanumeric coded information they may utilize in communicating with the paging equipment owner. The cards are gathered and either manually or automatically entered into a database which is periodically communicated to the paging receiver via a radio frequency communication link.

In one final aspect of the present invention, an optional calendar may be provided within the paging device, which includes fields associated with particular dates. The fields may be filled with information utilizing one or more of the data communication techniques discussed above. The pager may be programmed with an internal clock (and calendar) which automatically prompts the page equipment owner of an appointment or scheduled event. This information may likewise be communicated in mass or intermittently via one or more of the communication techniques described above.

Additional objectives, features and advantages will be apparent in the written description which follows.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 depicts a portion of a database which attributes textual messages to particular numeric or alphanumeric codes;

FIG. 6 depicts a memory buffer which stores paging requests received or transmitted to a portable communication device;

FIGS. 7, 8, and 9 depict alternative portable communication devices in accordance with the present invention;

FIG. 12 depicts a database with a plurality of data fields which identify information which pertains to potential communicants, and which is maintained in memory within the portable communication device;

FIGS. 19, 20, 21, 22, and 23 depict in block diagram, schematic, and flowchart form a technique for developing a database with information pertaining to potential communicants for utilization in the portable communication device of the present invention.

DETAILED DESCRIPTION OF THE INVENTION

Figure 1:
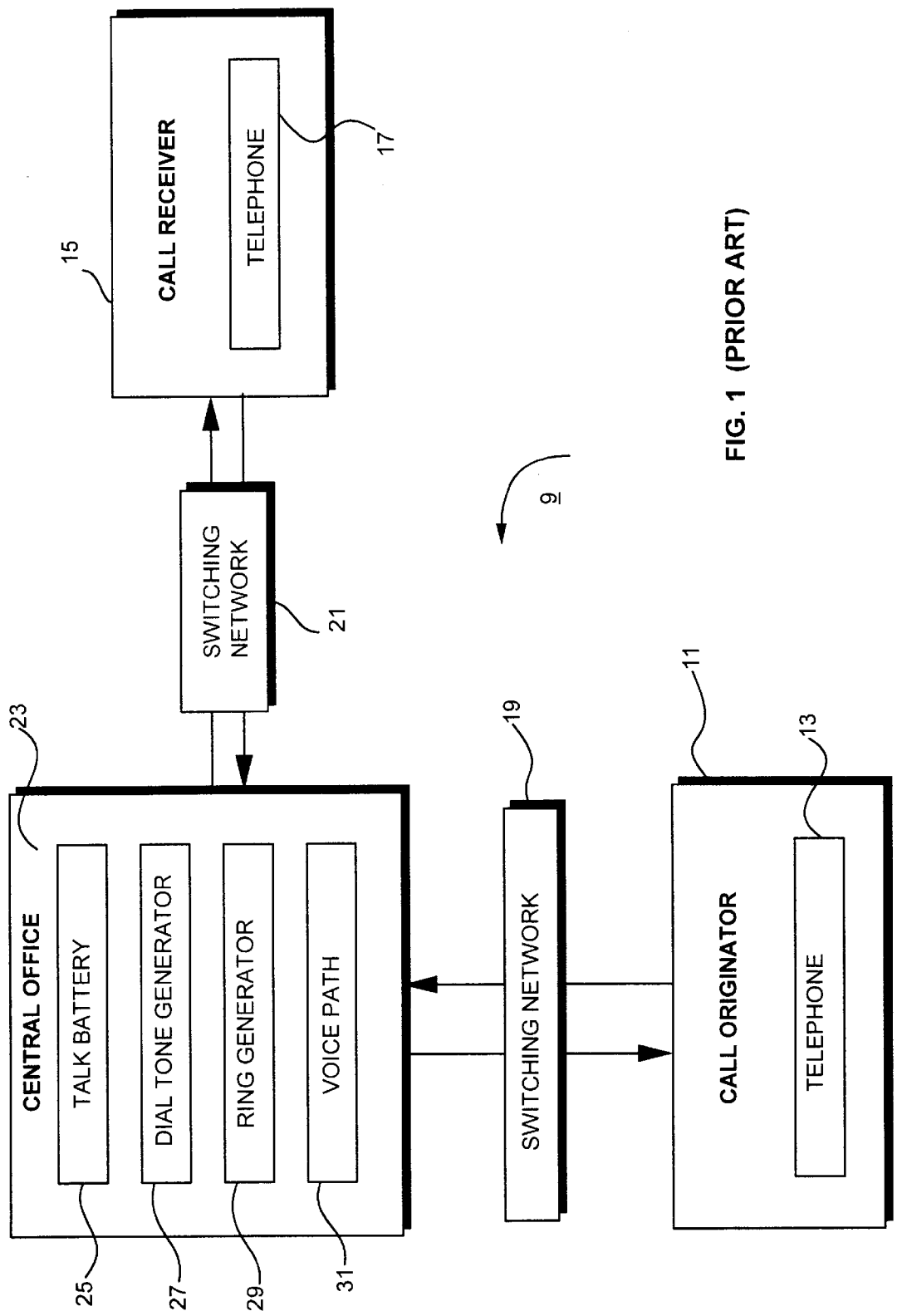
FIG. 1 depicts a prior art telephone communication network.

FIG. 1 provides a simplified block diagram of a telephone network, in accordance with the prior art, which will be utilized to describe some fundamentals of telephony which may be necessary to understand the present invention. As is shown, telephone network 9 can be utilized to allow call-originator 11 to utilize telephone 13 to place a telephone call to call-receiver 15, which utilizes telephone 17 to receive such a call. Fairly elaborate switching networks 19 and 21 connect call-originator 11 and call-originator 15 to central office 23 of telephone network 9.

In central office 23, there is a source of electrical current, identified as talk battery 25, which is utilized to determine whether or not a particular telephone (i.e., telephone 13 or 15) is in the "on-hook" or "off-hook" condition. If the handset of a particular telephone is lifted from the cradle of the telephone, the telephone goes from an on-hook condition to an off-hook condition. When a particular telephone is in an off-hook condition, dial tone generator 27 at central office 23 of telephone network 9 is utilized to generate an audible dial tone which indicates to the telephone operator that an outgoing call may be initiated. For example, call-originator 11 may lift the handset from the cradle of telephone 13, and receive an audible dial tone through the operation of dial tone generator 27 and central office 23.

After call-originator 11 dials the telephone number of call-receiver 15, ring generator 29 at central office 23 generates a plurality of ring signals which are sent through switching network 21 to telephone 17 to alert call-receiver 15 that a call is incoming. Once call-receiver 15 lifts his or her handset off of the cradle of telephone 17, voice path 31 is established between call-originator 11 and call-receiver 15.

Figure 2A:
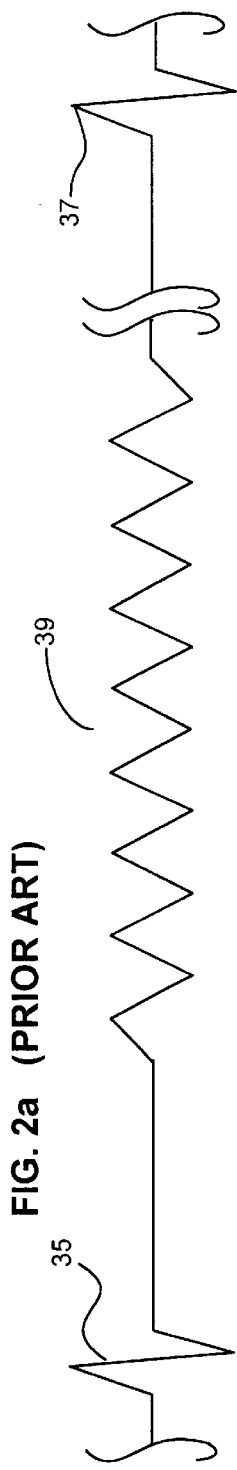
FIGS. 2a, 2b, and 2c depict schematically caller-identification information which is transmitted over a telephone network.

In accordance with current Bell standards, caller-identification information may be transmitted, automatically, between call-originator 11 and call-receiver 15, through telephone network 9, in a manner which will be described below with reference to FIGS. 2a, 2b, and 2c. In the United States of America, in accordance with the Bellcore Specification No. 220, the transmission must occur between the first and second rings. In FIG. 2a, such caller-identification information signals transmitted to call-receiver 15 are depicted in simplified form, with caller-identification information 39 occurring between first ring 35 and second ring 37. The Bellcore Specification requires that caller-identification information 39 occur at least 500 milliseconds after first ring 35 ceases. Thus, the signal which represents the caller-identification information will begin transmission one-half of one second, or longer, after the termination of first ring 35. Caller-identification information 39 is transmitted serially, utilizing a frequency-shift-keying technique, which is well known in the prior art.

The Bellcore Specification also requires that the transmission of caller-identification information 39 end at least 427 milliseconds prior to the commencement of second ring 37. Typically, there is a four second interval between first ring 35 and second ring 37, so a significant amount of time is available for the communication of caller-identification information. Altogether, there is available a period of 2,570 milliseconds for the transmission of caller-identification information, not including pauses required by the Bellcore Specification (such pauses or periods of silence are required at the beginning and end of the message). At 1,200 baud, this message interval is sufficient to transmit 3,084 bits, or 308 bytes.

Figure 2B:
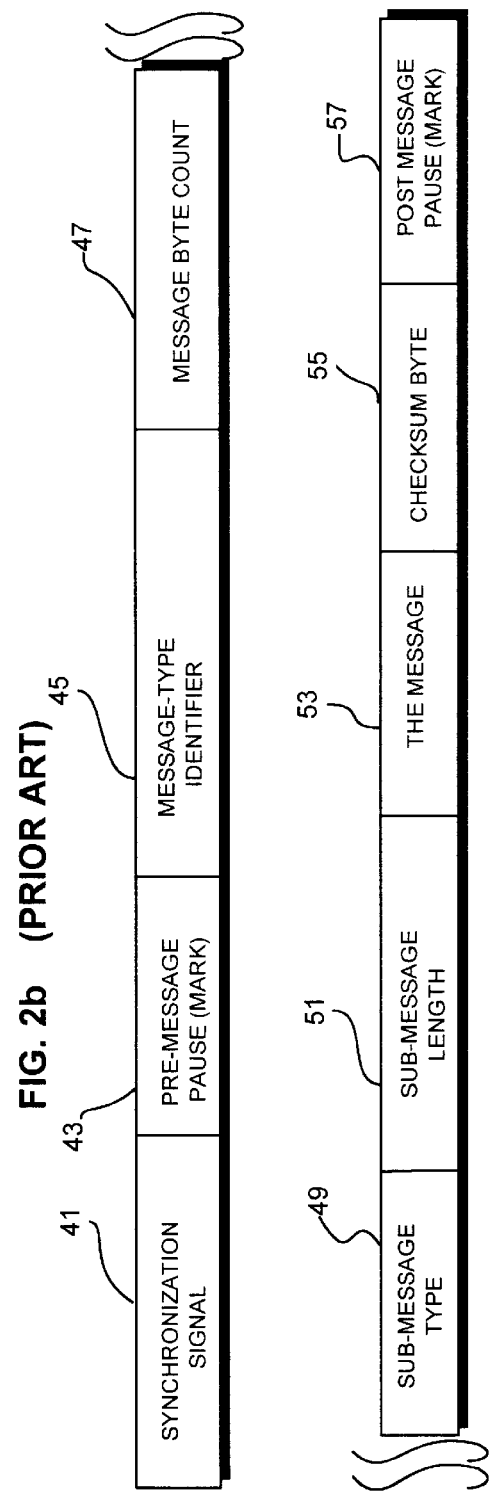

The blocks of data which make-up the caller-identification information 39 is set forth in block diagram form in FIG. 2b. The first component of the caller-identification information is a synchronization signal 41 which comprises a channel seizure signal having a duration of 250 milliseconds of frequency-shift-keying encoding of a bit pattern of alternating zeros and ones. Such a synchronization signal is utilized to provide a recognizable pattern to alert applicable caller-identification decoding equipment that caller-identification information follows. Pre-message pause 43 follows synchronization signal 41, and has a duration of 150 milliseconds, plus or minus 25 milliseconds. The purpose of such a pre-message pause 43 is to condition the receiver for the data which follows.

Next, message-type identifier 45 follows synchronization signal 41. Message type identifier 45 is typically one byte of data which identifies the type of caller-identification message which is being sent. There are two basic types of caller-identification messages, including: (1) only numeric data, which identifies the telephone number for the source of the telephone call; and (2) numeric data, which identifies a telephone number for the source of the telephone call, along with hexadecimal representation of alphabetic characters that contain the directory name associated with the telephone number of the source telephone. In accordance with the Bellcore Standard, 04 hexadecimal identifies a single message caller-identification message, while 80 hexadecimal identifies a caller-identification message which includes both a telephone number and a name.

Next, message byte count 47 provides an indication of the total length of the caller-identification information. This is important because the directory name associated with the source telephone number will have a different length for each particular name.

Thereafter, sub-message type 49 identifies the type of submessage which is transmitted with the caller-identification information. Sub-message link 51 identifies the length of the sub-message which follows.

Message 53 consists of information which is described in more detail below with respect to FIG. 2c. Message 53 is followed by checksum byte 55 which, in accordance with the prior art techniques, provides a checksum total to ensure that data received has not been lost or altered in any way during the transmission. The receiving unit of a caller-identification decoder generates a checksum in response to the entire caller-identification bit stream, and thereafter compares this checksum with checksum byte 55. If these checksums match, then no bits were lost in the transmission; however, if the checksum generated by the caller-identification decoder does not match checksum byte 55 received at the decoder, then one or more data bits may have been lost in the transmission, and the information may be unreliable or unusable.

The final component of a caller-identification message is post-message pause 57, which is a quiescent period prior to second ring 37 of FIG. 2a.

Figure 2C:
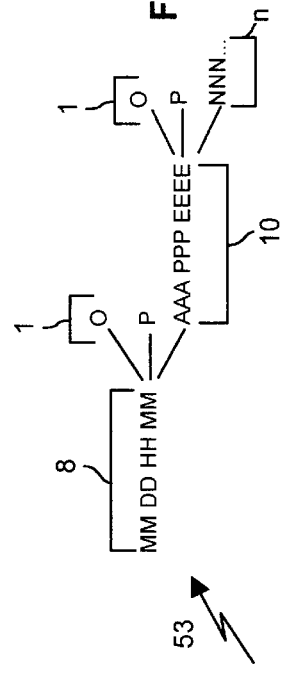

With reference now to FIG. 2c, message 53 will be described in greater detail. The first eight bits of the message include month bits "MM", day bits "DD", hour bits "HH", and minute bits "MM". These eight bits provide the month and date, along with the hour and minute, in military time, of the telephone call. Note that no information is provided regarding the year.

The next portion of message 53 is either (1) a ten digit telephone number, or (2) a single digit which identifies that caller-identification information is either (a) not available, or (b) has been blocked to maintain the caller's privacy.

If caller-identification information is not available, the ASCII character "0" is transmitted. If the caller-identification information has been blocked for reasons of privacy, the character P is transmitted. However, if the caller-identification information is neither unavailable nor blocked, then a ten digit bit stream follows. The first three bits, "AAA" identify the area code; the next three bits, "PPP", identifying the prefix; and the final four bits, "EEEE", identify the exchange. For example, if the source phone number is 702-731-1113, then AAA=702, PPP=731, and EEEE=1113.

The next portion of message 53 is caller-identification information which identifies the name associated with the particular preceding telephone number. If this information is unavailable, a single character "0" is provided. If this information is blocked for reasons of privacy, a single character "P" is provided. However, if this information is both available and not blocked, a multi-bit string follows which sets forth a name associated with the particular preceding telephone number (for example, "John Doe").

Therefore, considered broadly, caller-identification information may be solely data which identifies a telephone number associated with the telephone unit utilized to place a call, or the telephone number associated with the telephone unit utilized to place the call in combination with alphabetic characters identifying a name associated with that particular number in a telephone directory (i.e., a telephone director/ data base). In either event, whether the directory name is provided or not, this information can be considered to be the "caller-identification information." The particular details of the caller-identification standards in the United State of America are set forth in the publications of the Bell Communications Research Laboratories, which are identified as "Bellcore", and include (1) Technical Reference No. TR-TSY-00032, issued Nov. 1, 1986, and entitled "CLASS (sm) Feature: Bulk Calling Line Information"; (2) Technical Reference No. TR-TSY-000030, issued Jan. 1, 1990, entitled "CLASS(sm) Feature: Calling Number Delivery"; and (3) Technical Reference No. TANWT-001188, issued Mar. 1, 1991, entitled "CLASS(sm) Calling Name Delivery and Related Features Generic Requirements"; all of which are incorporated herewith by reference as if fully set forth.

Figure 3:
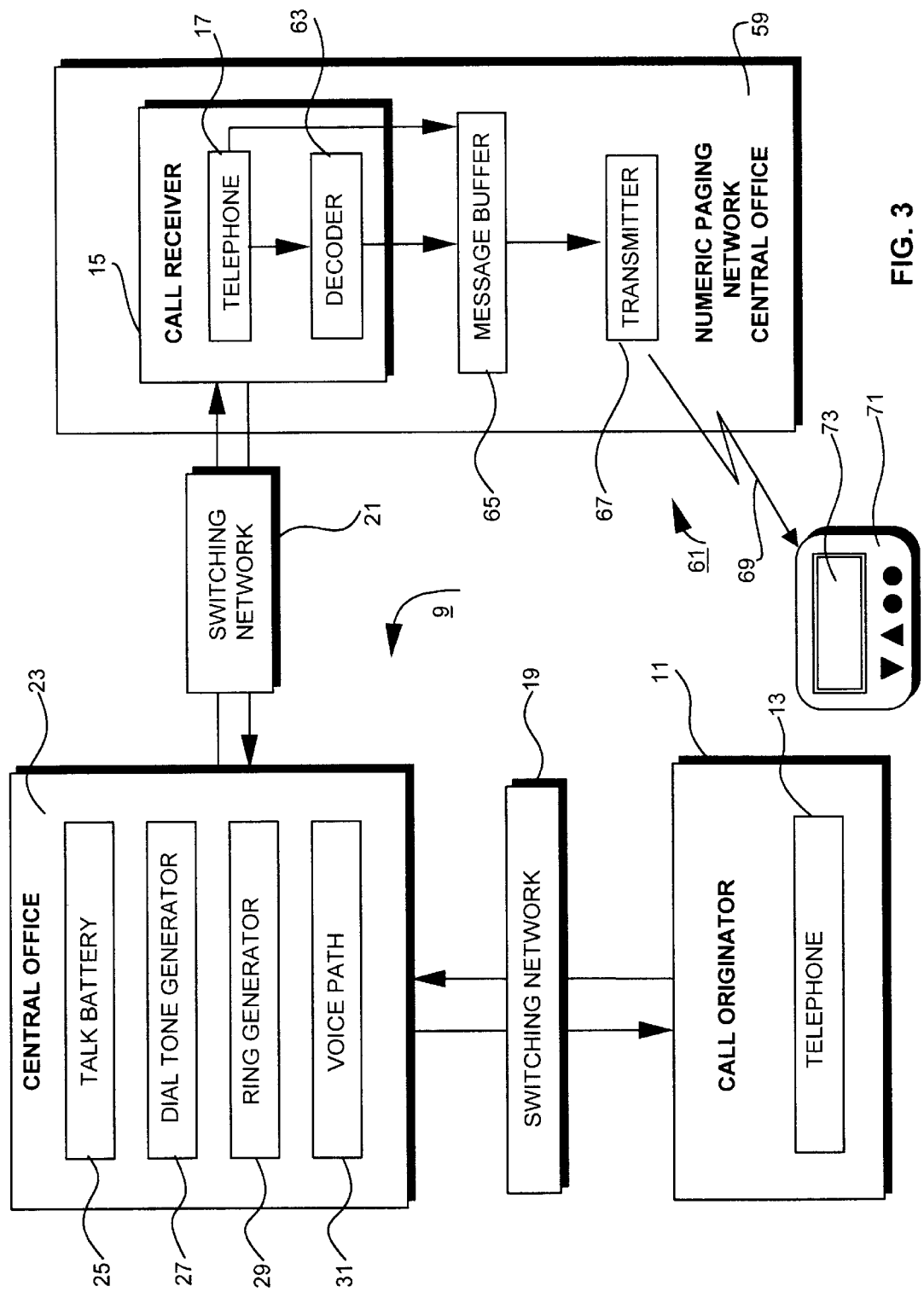
FIG. 3 depicts a numeric paging network in accordance with the present invention, which is coupled to a conventional telephone network.

FIG. 3 depicts one embodiment of the present invention wherein numeric paging network 61 is utilized to receive caller-identification information via interaction with telephone network 9 in response to call-originator 11 communicating through telephone network 9 with central office 59 of numeric paging network 61. In this configuration, numeric paging network 61 may be utilized to transmit the numeric portions of caller-identification information, and not the alphanumeric portions. FIG. 3 includes telephone network 9, which includes components identical to those discussed above in connection with FIG. 1, with the only difference being that a page request telephone call is received by call receiver 15, which is located within numeric paging network central office 59. Between the first and second rings received by call receiver 15, the caller-identification information is routed through telephone 17 to decoder 63.

Decoder 63 comprises a conventional caller-identification decoder capable of receiving the frequency-shift-keyed caller-identification signal, and decoding it into a bit stream representative of the information described above in connection with FIGS. 2*b* and 2*c*. The portion of information corresponding to the telephone number of particular telephone 13 being utilized by call originator 11 is provided as an input to decoder 63. Additionally, telephone 17 is utilized to receive any optional numeric message which is input by call-originator 11 and transmitted over voice path 31 during the time interval provided.

The decoded numeric information which corresponds to the telephone number of the telephone utilized by call-originator 11, and any numeric message input by call-originator 11, are assembled in message buffer 65, which pushes the serial bit stream to transmitter 67 in accordance with a predefined protocol. The present invention may utilize the predefined communication protocol identified as the Post Office Code Standardization Advisory Group (POCSAG) code. Such a code comports with the formats provided by the International Committee CCIR, which has standardized message coding for radio frequency transmissions. Both the POCSAG code and CCIR standards are well known by those skilled in the art, and both are incorporated herein by reference as if fully set forth, but are not essential to the main concepts of the present invention.

Transmitter 67 provides a radio frequency communication link 69 which communicates information from numeric paging network central office 59 to personal communication device 71. Personal communications device 61 may be a receive-only device, such as a paging device, or a more sophisticated bidirectional communication device, such as a personal communication device or personal digital assistant, such as the personal digital assistant sold under the trademark "Macintosh Newton" by Apple Computer, or the product sold by AT&T under the trademark "EO". Preferably, personal communication device 71 at least includes display 73, which is utilized to display information based, at least in-part, upon information contained within a database resident within personal communication device 71, or in-part upon information transmitted over radio frequency communication link 69 from central office 59 of numeric paging network 61.

Figure 4:
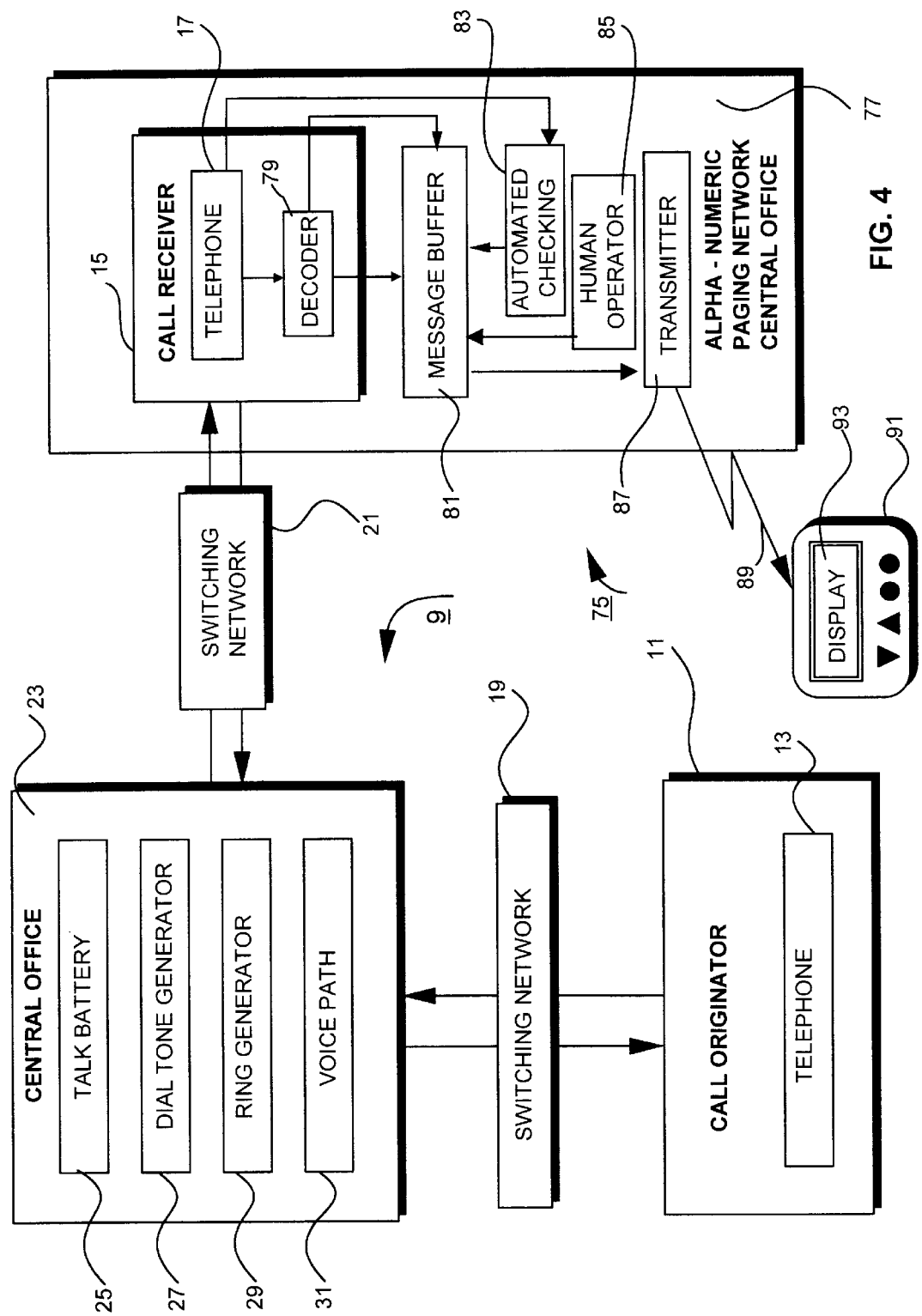
FIG. 4 depicts an alphanumeric paging network in accordance with the present invention, which is coupled with a conventional telephone network.

FIG. 4 provides a block diagram representation of another embodiment of the present invention wherein alphanumeric paging network 75 is utilized to receive caller-identification information. Such caller-identification information which may be received includes numeric information corresponding to the telephone number of telephone 13 utilized by call originator 11 to engage alphanumeric paging network 75, and alphanumeric text which identifies the "entity" listed in a telephone directory (i.e., a database) as the owner of the particular telephone number assigned to telephone 13. Call-receiver 15 receives the incoming call through switching network 21 on behalf of alphanumeric paging network 75. Call-receiver 15 is located within alphanumeric paging network central office 77.

The caller-identification information is routed from telephone 17 to decoder 79, where it is converted from the frequency-shift-key format transmitted within telephone network 9, to an acceptable binary or hexadecimal format. Such decoded caller-identification information includes numeric caller-identification information which corresponds to telephone 13 utilized by call-originator 11 to engage alphanumeric paging network 75, as well as alphanumeric textual information which identifies the "entity", as listed within the telephone directory database, which has ownership of that particular telephone number, along with other additional formatting information which was described above in connection with FIGS. 2a, 2b, and 2c.

This decoded caller-identification information is pushed from decoder 79 to message buffer 81, and may also be provided to automated checking routine 83. Automated checking routine 83 receives caller-identification information and formulates a textual or synthesized voice query, which may then be utilized to communicate with call-originator 11 to verify the telephone number for telephone 13 (which was derived from the caller-identification information) as well as the "entity" identity (which was also derived from the caller-identification information). The query may include the following questions:

(1) The caller-identification information provided to us through the telephone network indicates that the telephone number from which you are placing this call is AAA-PPP-EEEE; please depress your telephone key pad number "1" if this information is correct, or depress telephone key pad "2" if this information is incorrect.

(2) Your previous response has indicated to us that the telephone number provided through the caller-identification is incorrect. Please enter your correct telephone number at this time beginning with the area code.

(3) The caller-identification information provided to us through the telephone network indicates that this telephone number is assigned to "NNNNNNN"; please depress "1" if this information is correct. If this information is not correct, please hold for an operator.

(4) Please stand by for an operator if you desire to leave a detailed message; otherwise, please hang-up and your page will be directed to the intended recipient which you should now identify by depressing the keys on your telephone key pad, with the area code being entered first.

(5) If no detailed message is desired, hang-up and your page will be directed to area code "AAA", telephone number "PPP-EEEE". Thank you.

After this automated verification of the caller-identification number occurs, human operator 85 may be made available to call-originator 11 to take a detailed alphanumeric textual message. Human operator 85 keys a particular message into message buffer 81 prior to transmission of the message by transmitter 87, via radio frequency communication link 89, to remotely located personal communication device 91 which includes display 93. Upon receipt of the page, personal communication device 91 generates information for display in display 93 based at least in part on at least one of: (1) information communicated via radio frequency communication link 89; or (2) information contained within a database maintained within personal communication device 91.

While FIGS. 3 and 4 have been described with reference to a numeric paging network and an alphanumeric paging network, the present invention may be utilized with an alphanumeric paging network which allows for communication of a variety of page-originator generated messages, in a variety of formats. Such messages may be provided to the portable personal communication device in a variety of formats, including:

(1) textual information which include either numeric only, or alphanumeric data;

(2) digitized voice or audio information which may be communicated in analog form through the telephone network to the central office of the alphanumeric paging network, where the information is then digitized, and transmitted in a digital format which, upon reception, may be reconstructed to define an analog voice or audio signal which drives an audio output device resident in the personal communication device; or (3) digitized image information, such as a video image or an iconographic representation of information, which may be transmitted over the voice channel of the telephone network and received at the central office of the alphanumeric paging network, where it is then digitized, and transmitted to the remotely located personal communication device, where the digital information is reconstructed into an image which may be displayed on a display resident in the personal communication device.

Given this variety of message-format inputs, the personal communication device can provide an equally impressive array of display options. Textual input (including numeric and alphanumeric characters) can be displayed in a conventional manner on a simple and relatively inexpensive alphanumeric LCD display. Additionally, text which is provided as input to the personal communication device via the radio frequency communication link, may be utilized with a voice synthesizer to provide synthesized voice as an output from an audio output device resident in, or coupled to, the personal communication device.

Alternatively, an alphanumeric or numeric input supplied to the personal communication device may be utilized to recall one of a plurality of prestored audio output messages. For example, a table may be provided which identifies particular alphanumeric codes as corresponding to particular audio output messages. The binary characters "1111" may correspond to the audio output message "phone home now". Alternatively, a different code, such as "001," may correspond to the audio output message "phone your office now". The prerecorded and predetermined audio output messages may define a plurality of messages which alert the page-receiving communicant that a page has been received from a particular source, and indicating a particular urgency or requesting a level of diligence in response thereto.

Of course, as another option, digitized audio or voice data may be reconstituted into analog format to provide an audio output corresponding almost directly to the audio input provided by the page-originating communicant over the telephone lines to the central office of the paging network.

Digitized images may also be transmitted to the personal communication device in this manner for display on a more elaborate display, such as a personal computer-type display. Finally, digitized audio may be provided as an input to the personal communication device, which, in turn, may be utilized to generate a combination of signals, which may include an audible signal, or a preselected image, such as an icon, which may be placed on the display.

FIG. 5 provides one example of the utilization of a numeric message code, which is input at the personal communication device, to generate a textual message which provides, to the page-receiving communicant, information which allows him or her to respond in an appropriate manner to the page. As is shown in FIG. 5, the message code number column on the left corresponds to a textual message code on the right. Receipt of the "*1" message code results in the display of the message "call when you return" on the personal communication device. The receipt of the message code "*2" results in the display of the textual message "voice mail received" on the personal communication device. Receipt of the "*3" message code results in the display of the textual message "fax mail received" on the personal communication device. Receipt of the "*4" message code results in the display of the textual message "electronic mail received" on the personal communication device. Receipt of the "*5" message code at the personal communication device results in the display of the textual message "image data received". Receipt of the "*6" message code results in the display of the textual message "other data received" on the personal communication device. Finally, receipt of the "*911" message code at the personal communication device results in the display of the textual message "call immediately".

Of course, other various preselected and predefined textual messages are possible. To facilitate the use of this system, the paging network may provide a synthesized-voice and keypad driven exchange between the call-originating communicant and the central office of the paging network. Such an interface may be utilized until the various page-originating communicants learn one or more of the most useful message codes. After such message codes are learned, a user may thereafter bypass the synthesized-voice menu. Preferably, the information provided to the page-receiving communicant is stored in memory within the personal communication device for review at a later time. Typically, the personal communication device includes memory buffers sufficient to hold a selected number of messages received via the paging network, and other corresponding data.

FIG. 6 provides a view of one way in which the data received from the page-originating communicant may be organized. Such organized data may be stored at either the central office of the paging network or within the memory allocated for such purpose within the personal communication device. As illustrated, a plurality of locations are provided for storing caller-identification information (i.e., locations in the first column), DTMF data which may be entered by the page-originating communicant by utilizing the telephone handset (the second column), and caller message data which may be provided by the page-originating communicant through utilization of a variety of massaging techniques, but in this example, an alphanumeric messaging technique, such as that discussed above with respect to FIG. 5.

FIGS. 7, 8, 9a, 9b, and 9c provide views of three alternative physical configurations for the personal communication device in accordance with the present invention. Personal communication device 101 of FIG. 7 allows for two-way communication with the paging network. Personal communication device 101 includes display 103, which is preferably a display of the type utilized in portable personal computers, such as notebook computers. Display 103 may be utilized to display information, such as caller-identification information 105. Caller-identification information 105 may include an alphabetic identification of the name associated with the telephone number transmitted with the caller-identification information, or may include optional message 107 input by the page-originating communicant during the request for a page via the telephone network.

As is shown, other information 109, such as an address associated with the page-initiating communicant 105, may be retrieved from a database in the memory of the personal communication device and displayed along with the caller-identification information on display 103.

Figure 7:
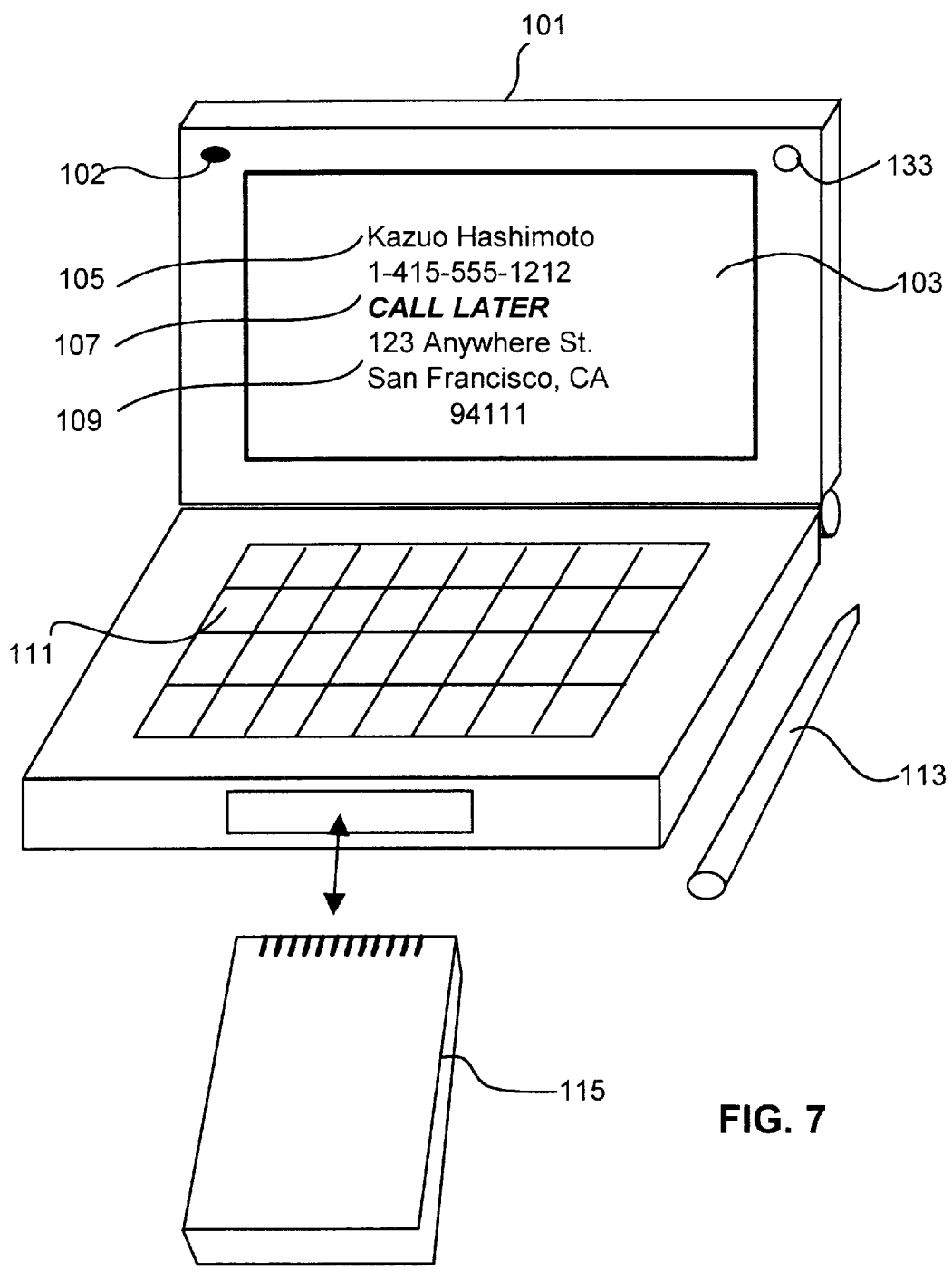

Personal communication device 101 of FIG. 7 also includes keyboard 111 and graphical pointing device 113, such as a touch pen, which may be utilized to select icons, menu buttons, or other items displayed in a graphical user interface. Preferably, personal communication device 101 allows two-way communication, and includes a cellular link to the telephone network and/or paging network. Additionally, data card 115 may be provided to load personal communication device 101 with a preconfigured database containing information pertaining to parties with which frequent communication may occur.

Figure 8:
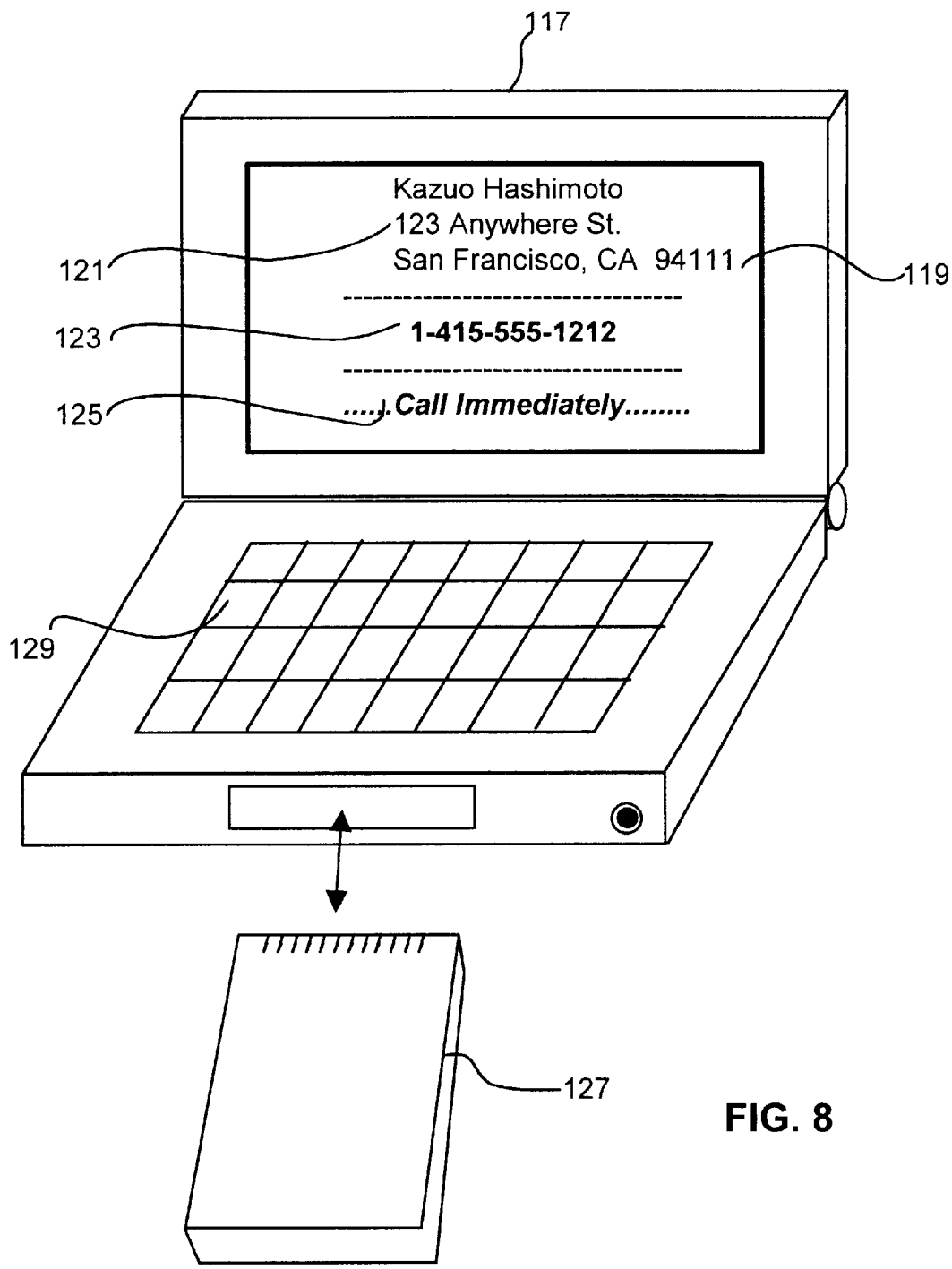

FIG. 8 provides a view of an alternative personal communication device 117, which allows only one-way communication; personal communication device 117 may receive information from the paging network, but may not directly originate an outgoing communication with the telephone network, or with the paging network. As is shown, personal communication device 117 includes display 119, which may display identification 121 of the page-originating communicant, along with his or her address. Telephone field 123 is also provided for displaying a telephone number at which the page-originating communicant may be reached. Furthermore, short message 125 may be provided to indicate either (1) the type of information which has been received at the paging network, or (2) the degree of urgency attached to the particular information received.

Data card 127 may be utilized to load personal communication device 117 with additional database information. In the preferred embodiment of the present invention, the information displayed in display 119 is based at least in-part upon caller-identification information, and at least in-part upon information recalled from the database resident in the memory of personal communication device 117 or within data card 127. As is shown in FIG. 8, keyboard 129 is provided to allow the page-receiving communicant a means to enter or manipulate data within the database.

A third, and still different, embodiment of the present invention is depicted in FIGS. 9a, 9b, and 9c. FIG. 9a provides a view of the bottom portion of personal communication device 131. Note that audio output device 133 is provided. Mechanical coupler 135 provides a means for acoustically coupling personal communication device 131 to any telephone equipment, particularly the mouthpiece of a telephone handset, against which audio output device 133 is disposed.

FIG. 9b provides a side view of personal communication device 131 of FIG. 9a. Note that RJ11 telephone jack, 137 is provided to connect the telphone line, to personal communication device 131.

FIG. 9c provides a view of the top portion of personal communication device 131. Display 139 is provided to receive and display numeric data, alphanumeric data, and images. A plurality of icons 141 are provided about display 139, each of which is dedicated for the communication of particular information. For example, icon 143 is representative of a clock, and may be utilized to indicate to the page-receiving communicant that time-sensitive information has been communicated to the paging network. For an alternative example, icon 145, which depicts a telephone, is provided to indicate to the page-receiving communicant that a telephone message has been received by the paging network. A variety of other dedicated iconographic representations are provided about display 139, each of which is dedicated to communicate particular, predefined information to the page-receiving communicant pertaining to information deposited at the paging network.

The device depicted in FIGS. 9a, 9b, and 9c allows only the receipt of information from the paging network, and utilizes the dedicated icons to communicate particular types of information to the page-receiving communicant. This allows the small display 139 to be utilized for less-routine types of information.

Figure 10:
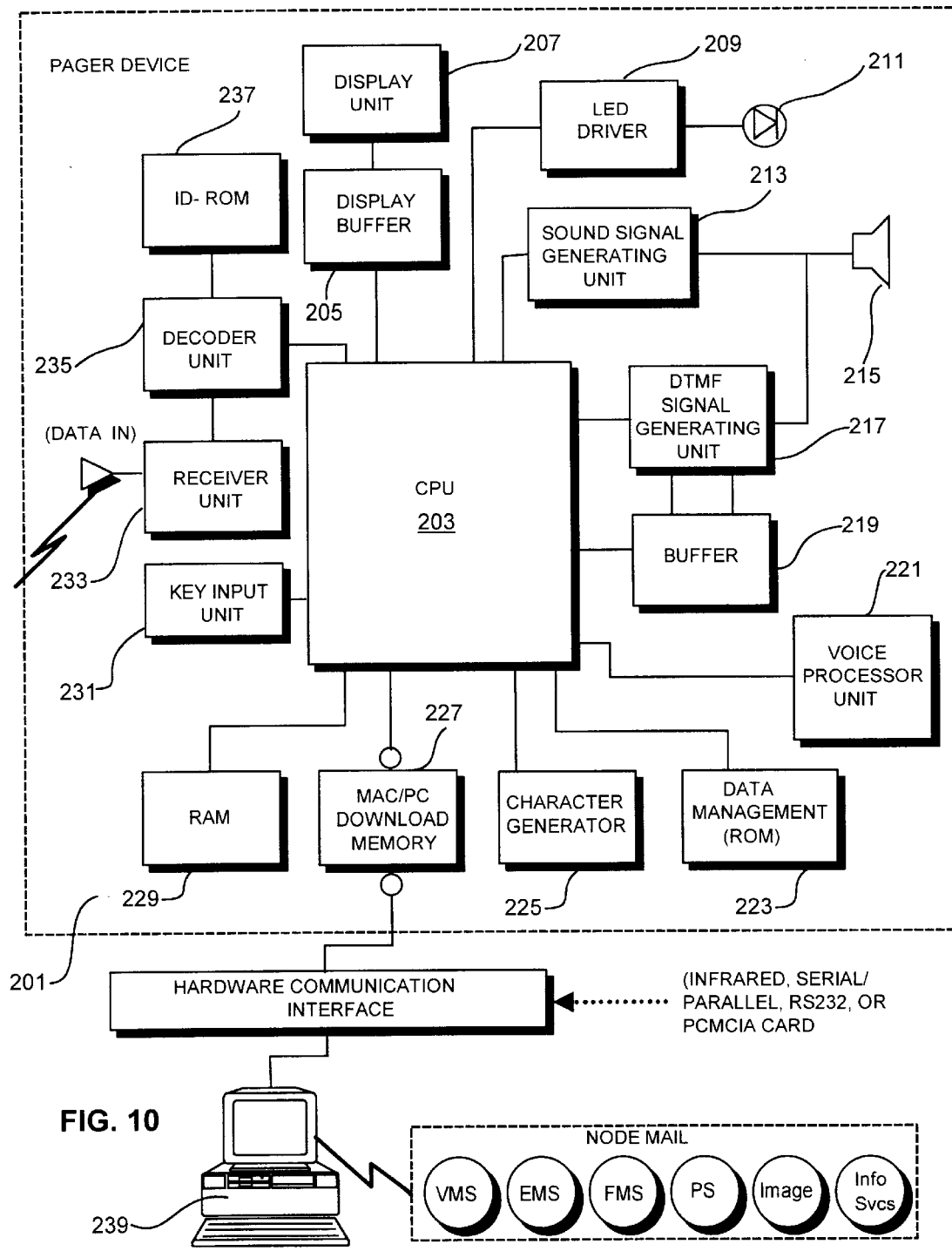
FIG. 10 depicts in block diagram form the operational blocks of a portable communication device in accordance with one embodiment of the present invention.

FIG. 10 provides a block diagram view of portable communication device 201. As is shown, portable communication device 201 includes central processing unit 203, which preferably comprises a microprocessor. The microprocessor of central processing unit 203 interacts with the plurality of hardware and software components. Key pad input unit 231 communicates with central processing unit 203 to allow for the operator to depress particular keys on a keyboard thereby inputting data into portable communication device 201. Receiver unit 233 is utilized to receive radio frequency communication from the paging central office. Decoder unit 235 is utilized to decode radio frequency signals received from receiver unit 233. Decoder unit 235 communicates with central processing unit 203 to power-up central processing unit 203 when a page notification intended for portable communication device 201 is received at receiver unit 233. ID-ROM 237 is utilized to record in memory a particular numeric or alphanumeric identifying information which is provided to code each particular portable communication device in a paging network so that it is responsive to a particular radio frequency transmission. ID-ROM 237 records the particular identification code assigned to that particular communication device.

Central processing unit 203 communicates through display buffer 205, in a conventional manner, to place numeric data, alphanumeric data, and images, such as icons, on display unit 207. Light-emitting-diode 211 is provided to provide a flashing indication of the receipt of a page. LED driver 209 is positioned intermediate central processing unit 203 and LED 211, to allow central processing unit 203 to drive LED 211 in a variety of flashing patterns. Sound-signal generating unit 213 is coupled between central processing unit 203 and audio output device 215. Central processing unit 203 provides binary control signals to sound-signal generating unit 213 which result in the output of a particular tone, at a particular volume and a particular frequency. DTMF signal generating unit 217 is coupled between central processing unit 203 and audio output device 215. It is utilized, when desired, to generate dialing tones which may be communicated through audio output device 215 to the mouthpiece of a telephone to place a call utilizing the telephone network. Buffer 219 is coupled to central processing unit 203 and DTMF signal generating unit 217, and is provided for queuing of DTMF generating signals. Voice processing unit 221 is coupled to central processing unit 203 to allow the analog-to-digital and digital-to-analog conversion of speech and other audio input "(102 of FIG. 7 and 102 of FIG. 9c)" or output. (133 of FIG. 7 and 133 of FIG. 9A).

Several housekeeping functional blocks are also provided in the view of FIG. 10. RAM 229 is provided as a memory cache. In the preferred embodiment of the present invention, a database including a plurality of fields which identify actual or potential communicants by name, address, and appropriate telephone and facsimile numbers, is resident within RAM 229. Character generator 225 communicates with central processing unit 203 to generate particular alphanumeric characters in response to commands from central processing unit 203. MAC/PC download memory 227 operates a data exchange buffer to allow for the communication of data between central processing unit 203 and personal computer 239. Personal computer 239 may be utilized to store in memory the database which is intermittently downloaded through MAC/PC download memory 227 for storage in RAM 229. As is shown in FIG. 10, personal computer 239 is coupled in a node mail network which allows for voice mail service (VMS), fax mail service (FMS), electronic mail service (EMS), paging service (PS), images, and connection to information services.

Figure 11:
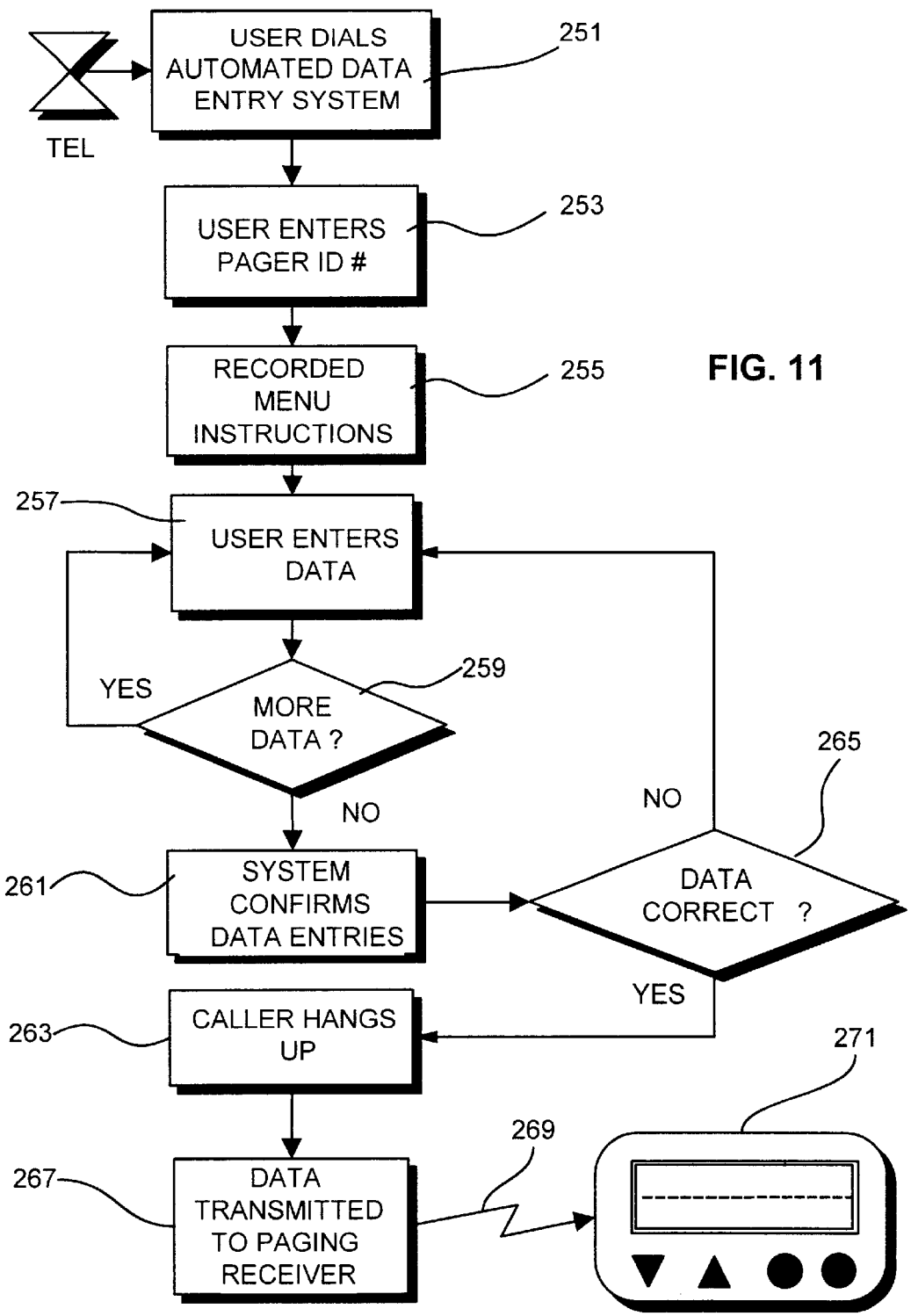
FIG. 11 depicts in flowchart form the process of engaging a paging network via a telephone network.

FIG. 11 provides a flowchart representation of the technique in accordance with the present invention for communicating information between a page-originating communicant and a page-receiving communicant. The process starts at software block 251, wherein the page-originating communicant (user) utilizes the telephone network to access an automated data entry system. As discussed above, upon establishment of a voice circuit between the telephone unit utilized by the page-originating communicant and the paging center, the caller identification information, if any exists, is automatically transferred to the central office, where it is decoded and preferably utilized in accordance with software block 255 in a recorded menu exchange, wherein the information is verified and/or corrected and/or supplemented.

In software block 257, the page-originating communicant enters optional data. This optional data may be numeric data, alphanumeric data, digitized speech, facsimile messages, or images. In accordance with software block 259, the paging system identifies when the data entry has been completed, and confirms the data entry in accordance with software block 261. In accordance with software block 265, the paging network verifies the data, preferably by displaying it or otherwise making it available to the page-originating communicant. In accordance with software block 263, the page-originating communicant hangs-up, and then, in accordance with software block 267, the data, including the caller-identification information and any optional or other data attached to the page information, is transmitted via radio frequency communication link 269 to portable communication device 271.

The most common application of the present invention requires that the page-originating communicant enter either numeric or alphanumeric data which is identified with the caller-identification information. Upon receipt by portable communication device 271, at least one of either the numeric caller-identification information, or the alphabetic caller-identification information, or the optional data entered by the page-originating communicant is compared to one or more data fields in a database which is maintained within memory (preferably RAM 229 of FIG. 10) of portable communication device 271 (of FIG. 11).

FIG. 12 depicts one example of such a database. As shown, there are five data fields associated with each entry: a telephone number field, a fax number field, a name field, an "other data" field (preferably utilized for addresses) and a notification type and intensity field.

In one particular embodiment of the present invention, the numeric or alphanumeric data entered by the page-requesting communicant is compared to an appropriate data field. For example, if the page-originating communicant entered numeric telephone data as part of the page request, this numeric telephone data is compared to numeric data fields which are representative of telephone numbers in order to determine if one or more matches exist. If a match exists, it is probable that the page-requesting communicant is the entity identified in an associated data field. For example, if a telephone number is entered in the page request which corresponds to the first number in the database, it is highly likely that Mr. Hashimoto, the first name in the database, is the page-originating communicant.

The caller-identification information is also compared with one or more data fields in the database. In one specific embodiment, numeric telephone data from the caller-identification information is compared to numeric fields which represent telephone numbers, in order to determine if one or more matches exists. If no matches exist, it is highly likely that Mr. Hashimoto is calling from a telephone which is not ordinarily associated with him. The page-receiving communicant can then decide to either return the call immediately, or defer it to a later time. In this event, the page-receiving communicant knows that Mr. Hashimoto is the likely page-originating communicant, and that he can be reached at this particular time at the number identified in the caller-identification information. In this manner, a protocol can be devised which automatically access one or more of: (1) numeric or alphabetic characters that are located within the caller-identification signal; and/or (2) numeric or alphanumeric characters entered by the page-originating communicant into one or more data fields, in order to identify the likely identity of the page-originating communicant, and to further to identify whether the likely page-originating communicant is calling from a familiar telephone or an unfamiliar telephone.

In instances where the caller-identification information fails to produce a match, the page-receiving communicant may be provided with a particular type of notification to indicate that a person is contacting him or her, or attempting to contact him or her, and such a person is not listed within the database at this time. This may prompt the owner of the personal communication device to utilize a key pad or alternative means to enter that entity upon return of the telephone call.

The notification type field is interesting, insofar as it is user configurable, allowing the page-receiving communicant to identify a particular type, or subtype, of paging notification with one or more particular likely communicants. For example, LED displays from LED 201 (of FIG. 10) may be utilized to identify work associates, while audio tones emitted from audio output device 215 (of FIG. 10) may be utilized to indicate that friends or family are attempting to notify the page-receiving communicant.

Preferably, the user may establish intensity levels or sequence levels for particular types of page alert notifications. For example, the notation "VI" indicates a visual indication with a high intensity. In contrast, the notation "BL" may denote a beep (that is, audio output) of a low intensity. Still, in further contrast, the notation "T" may identify that, for this particular potential communicant, only textual messages should be utilized to identify receipt of the page. In this hierarchical structure, the entity which is assigned the "T" notification type and intensity, is a fairly low priority potential communicant, while the communicant which has the "VI" notification type and intensity indicator identified therewith is a relatively high priority communicant. In this manner, the page-receiving communicant may be able to prioritize his or her return phone call activities.

A variety of mechanisms by which the owner of the portable communication device may enter data, revise data, or review data are depicted graphically in FIGS. 13, 14, 15, and 16.

Figure 13:
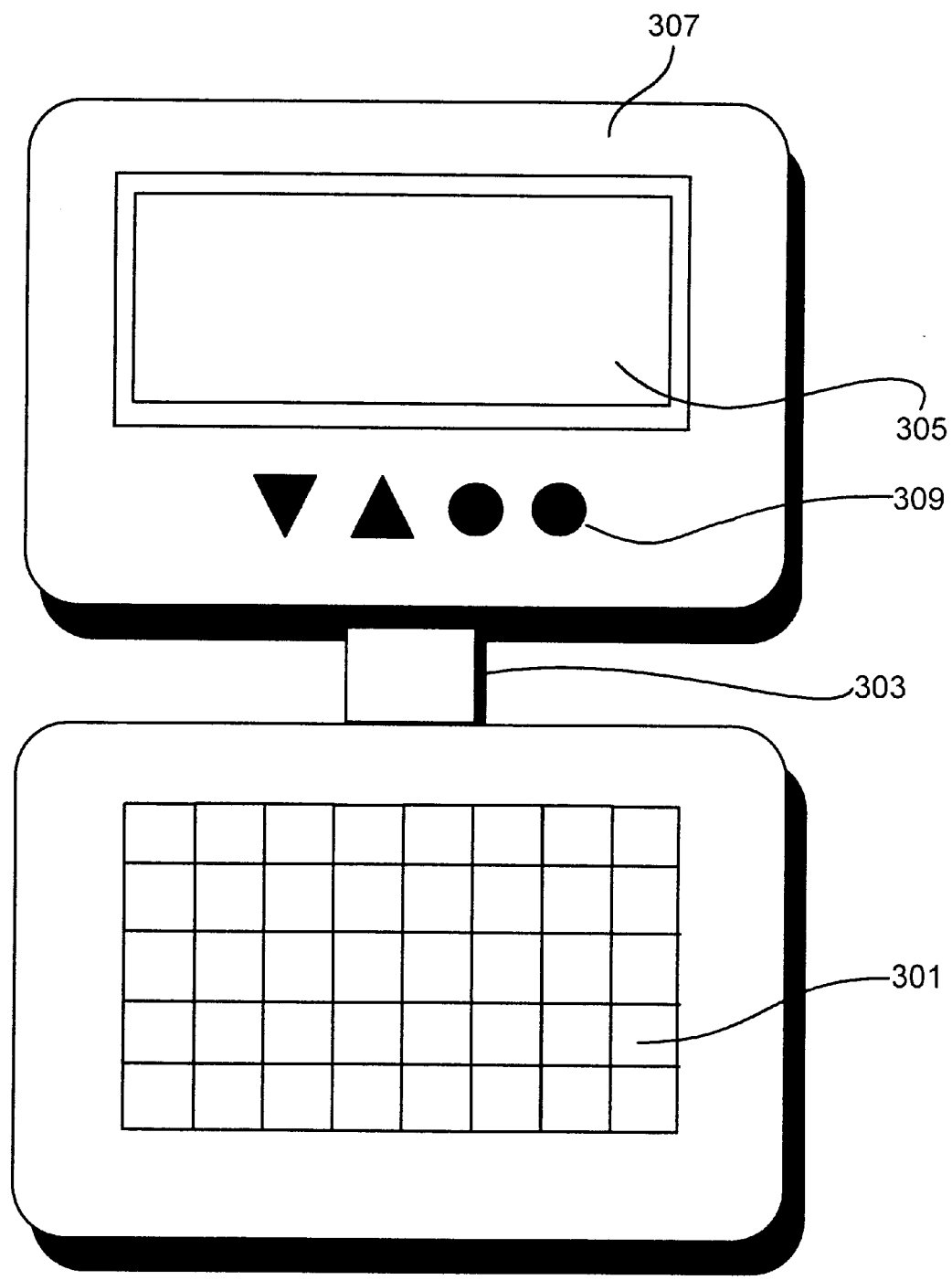
FIGS. 13, 14, 15, and 16 depicts alternative configurations of the portable communication device in accordance with the present invention.
Figure 14:
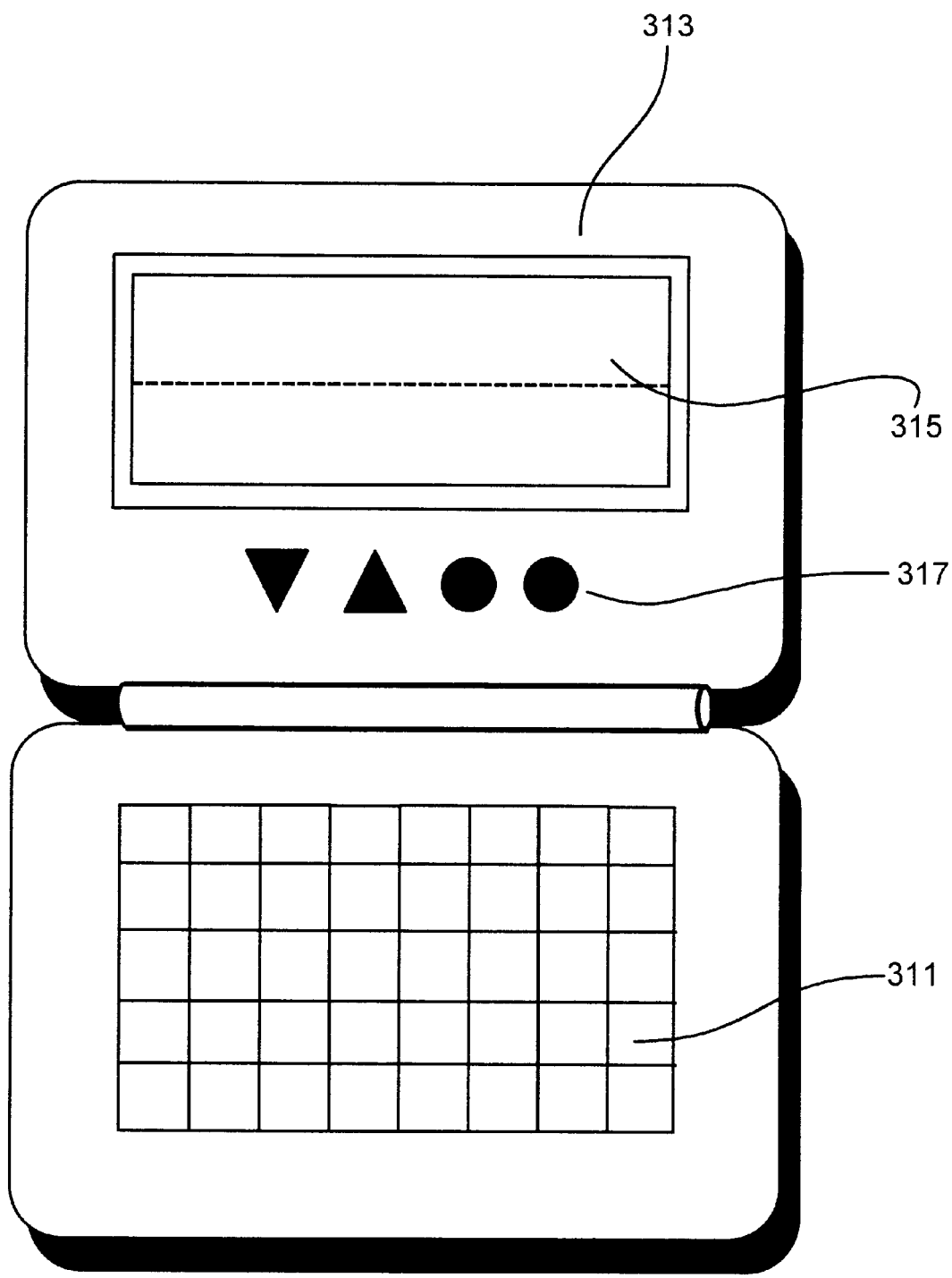

FIG. 13 depicts a portable communication device with a detachable input interface, such as keyboard 301, which releasably connects through connector 303 to paging receiver 307. Display 305 is also included in paging receiver 307. Paging receiver 307 also includes pager operation switches 309. The owner of this paging device may selectively releasably connect keyboard 301 to paging receiver 307, and then depress one or more keys on keyboard 301 to enter data at a cursor location which is presented within display 305. This device stands in sharp contrast with the device of FIG. 14, which includes keyboard 311 that is substantially permanently coupled to paging receiver 313. Paging receiver 313 also includes display 315. Paging receiver 313 preferably includes pager operation switches 317. The operator may utilize keyboard 311 to enter or modify data within display 315. More particularly, the operator may utilize keyboard 311 to add or modify data contained in the plurality of fields of the database maintained within the memory of the portable communication device.

Figure 15:
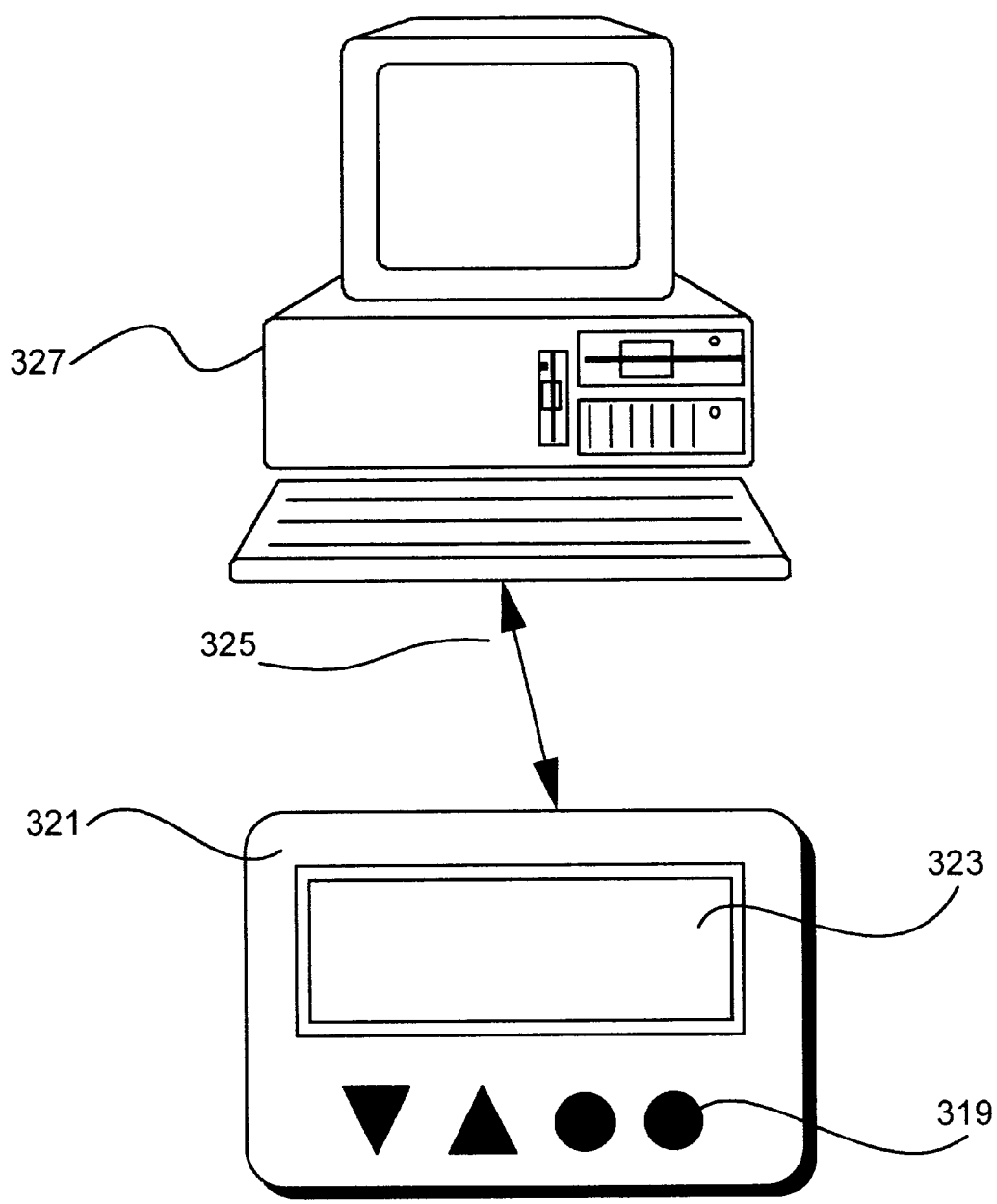

FIG. 15 provides yet another alternative embodiment contemplated under the present invention. As is shown, paging receiver 321 is provided, and can be selectively and releasably coupled to personal computer 327 via a serial hardwire line, a parallel hardwire line, an infrared link, or a radio frequency link. Personal computer 327 may be utilized to create and maintain the database with a plurality of data fields, including such fields as communicant's name, communicant's telephone number, communicant's fax number, communicant's address, and a field containing an operator-selectable notification attribute or type. Such data may be intermittently transferred between personal computer 327 and paging receiver 321, and maintained within a random access memory within paging receiver 321.

Paging receiver 321 includes display 323 and pager operation switches 319, which allow for conventional paging functions. In this embodiment, the data contained within the database of paging receiver 319 is periodically refreshed by the owner by conducting memory dumps from personal computer 327 to paging receiver 321. Upon receipt of a page notification, the caller identification information and/or optional data input by the page-originating communicant is compared with one or more fields of the database contained within the memory of paging receiver 321.

Figure 16:
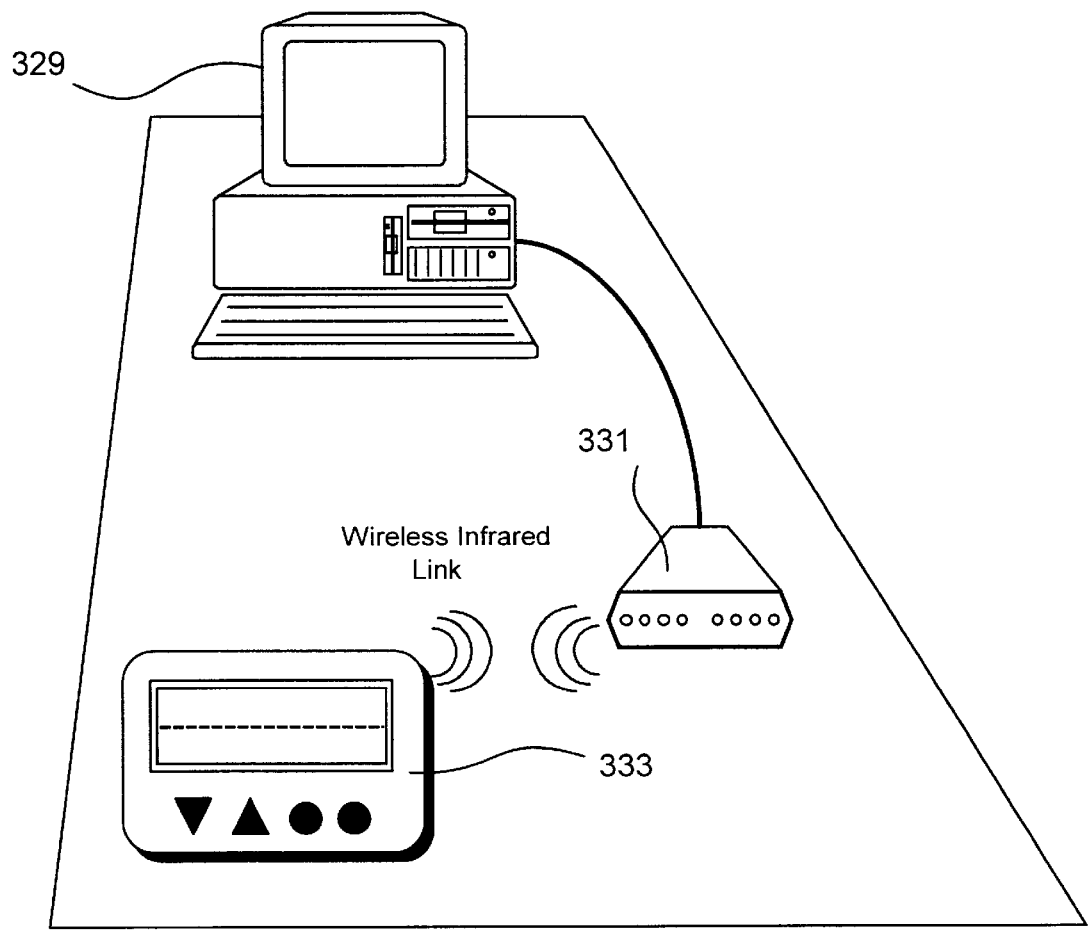

FIG. 16 provides a view of yet another alternative embodiment contemplated in the present invention. In this system, a very inexpensive paging unit, with limited display capabilities, includes a memory for the receipt of the database with a plurality of data fields including communicant's names, communicant's phone numbers, communicant's fax numbers, communicant's addresses, and any user-selected notification attribute identified to that particular communicant. The communication is periodically dumped in a methodical fashion from personal computer 329 via wireless infrared communicator 331 to portable paging receiver 333.

Figure 17:
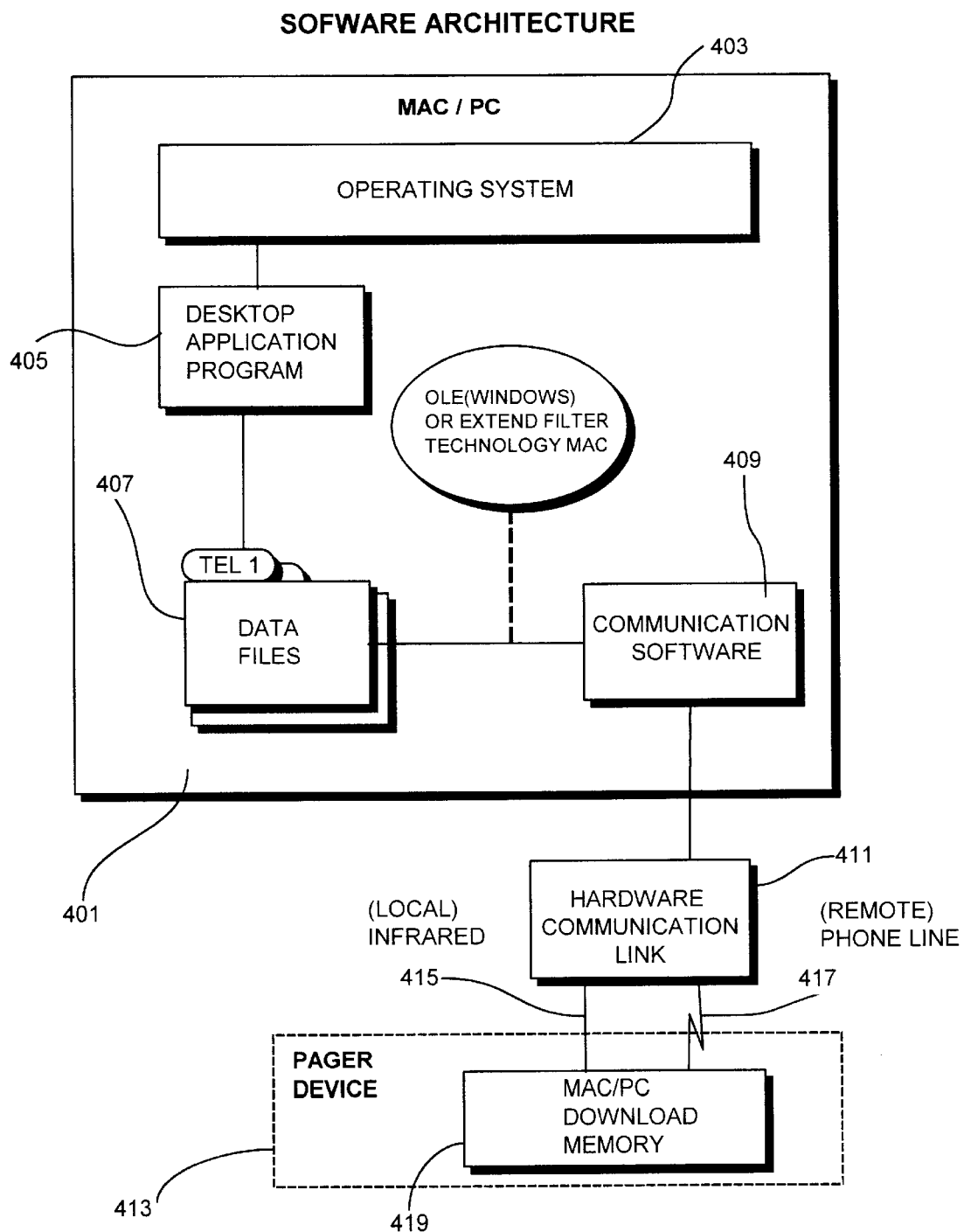
FIG. 17 is a block diagram representation of the hardware and software components which are utilized to exchange data between a computing device and the portable communication device of the present invention.
Figure 18:
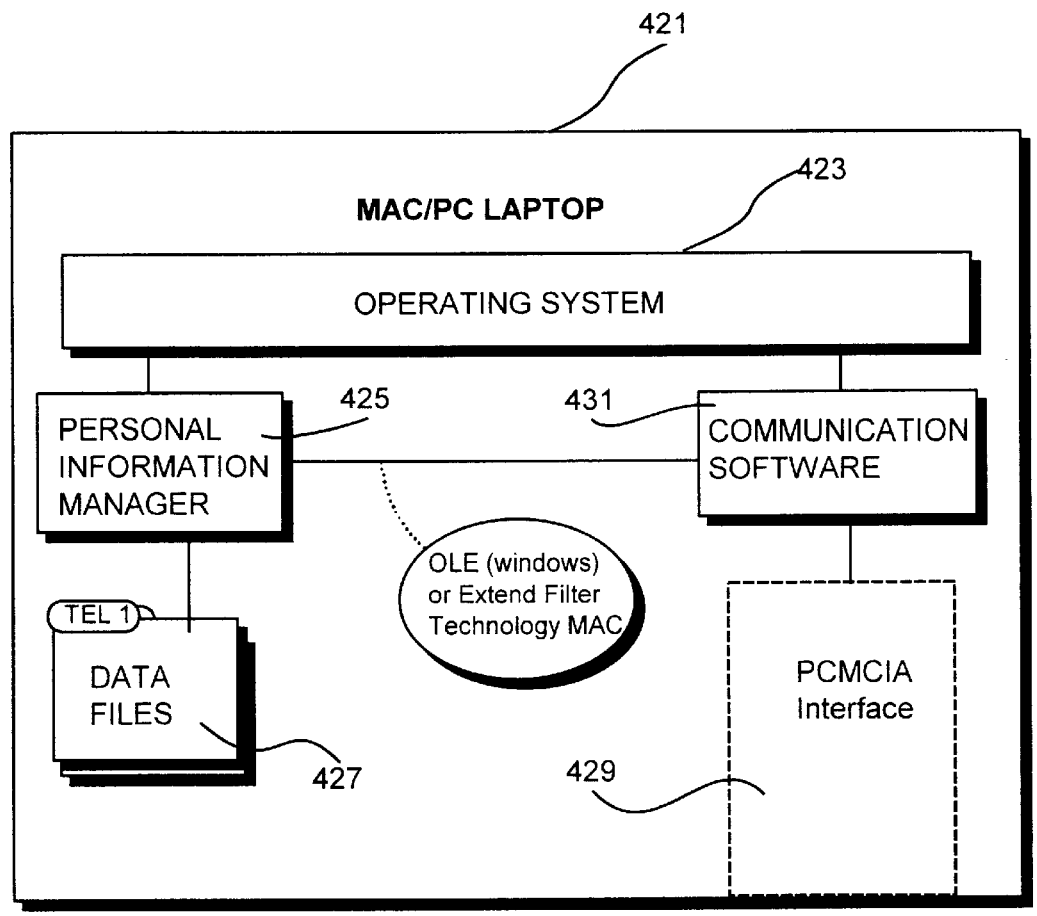
FIG. 18 depicts yet another configuration of the components which cooperate to transmit data between a computing device and the portable communication device.
Figure 18:
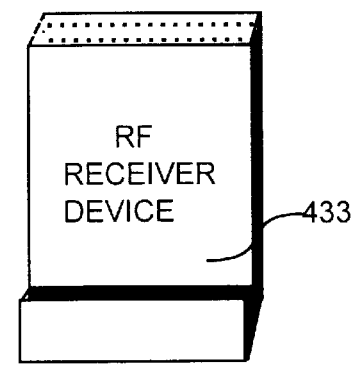

FIGS. 17 and 18 provide block diagram views of the software and hardware components which facilitate the communication of the database between a computing device, such as a personal computer, and the portable communication device. In accordance with FIG. 17, the personal computing device 401 includes operating system 403, desktop application programs 405, data files 407, and intellect communication software 409 which is resident in memory within the computing device, and which is utilized in the transfer of information between computing deice 401 an the portable communication device 413, which includes download memory 419 which is adapted to receive the database information. As is shown, the portable communication device 413 may be connected via either hardware communication link 411, local infrared communication 415, or remote telephone input 417. In FIG. 18, a laptop architecture is displayed for laptop 421, which includes operating system 423, personal information manager 425, data files 427, PCMCIA interface 429 and communication software 431 which facilitates the transfer of information from the memory of the laptop computing device 421 to the portable computing device 433.

Figure 19:
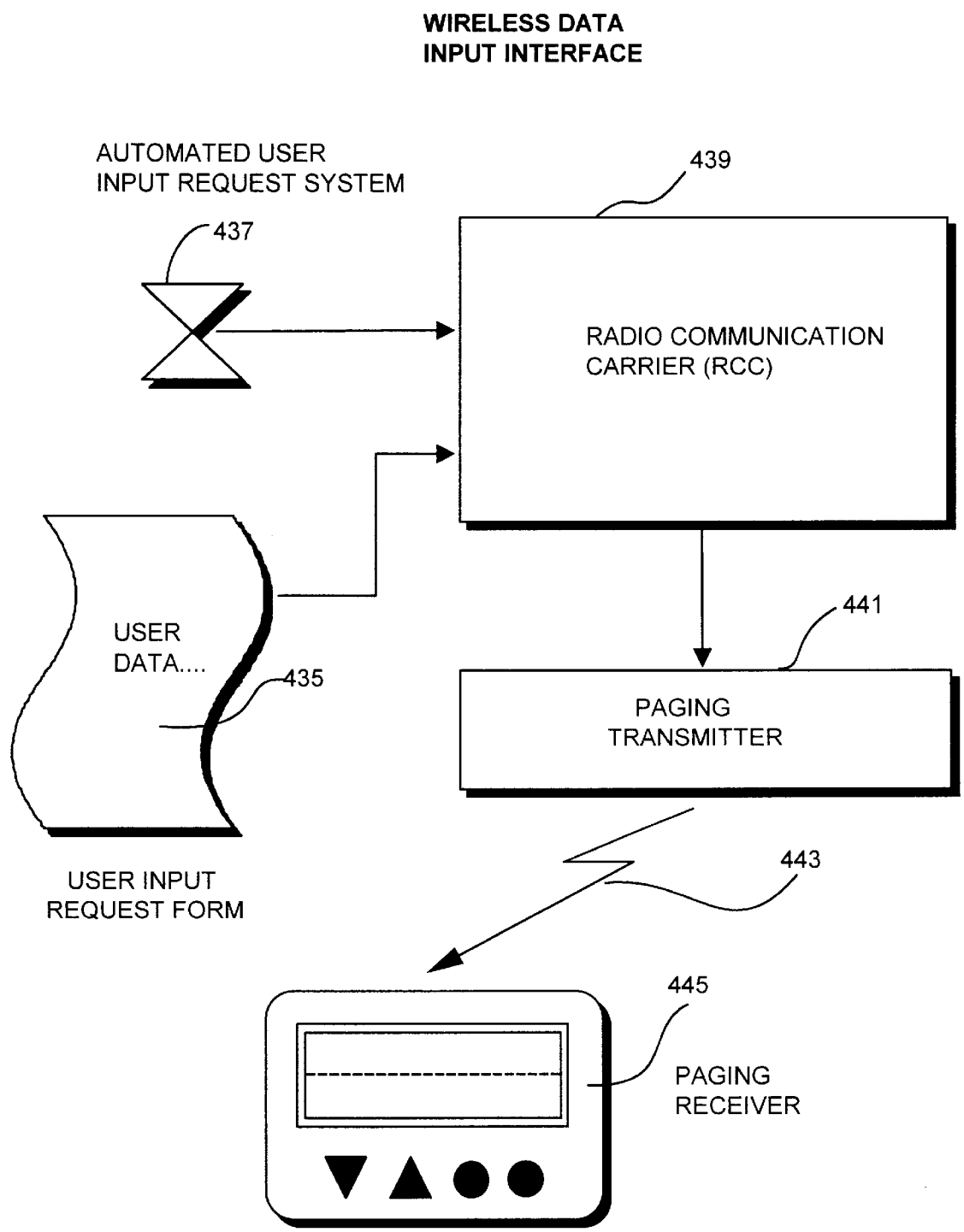
Figure 20:
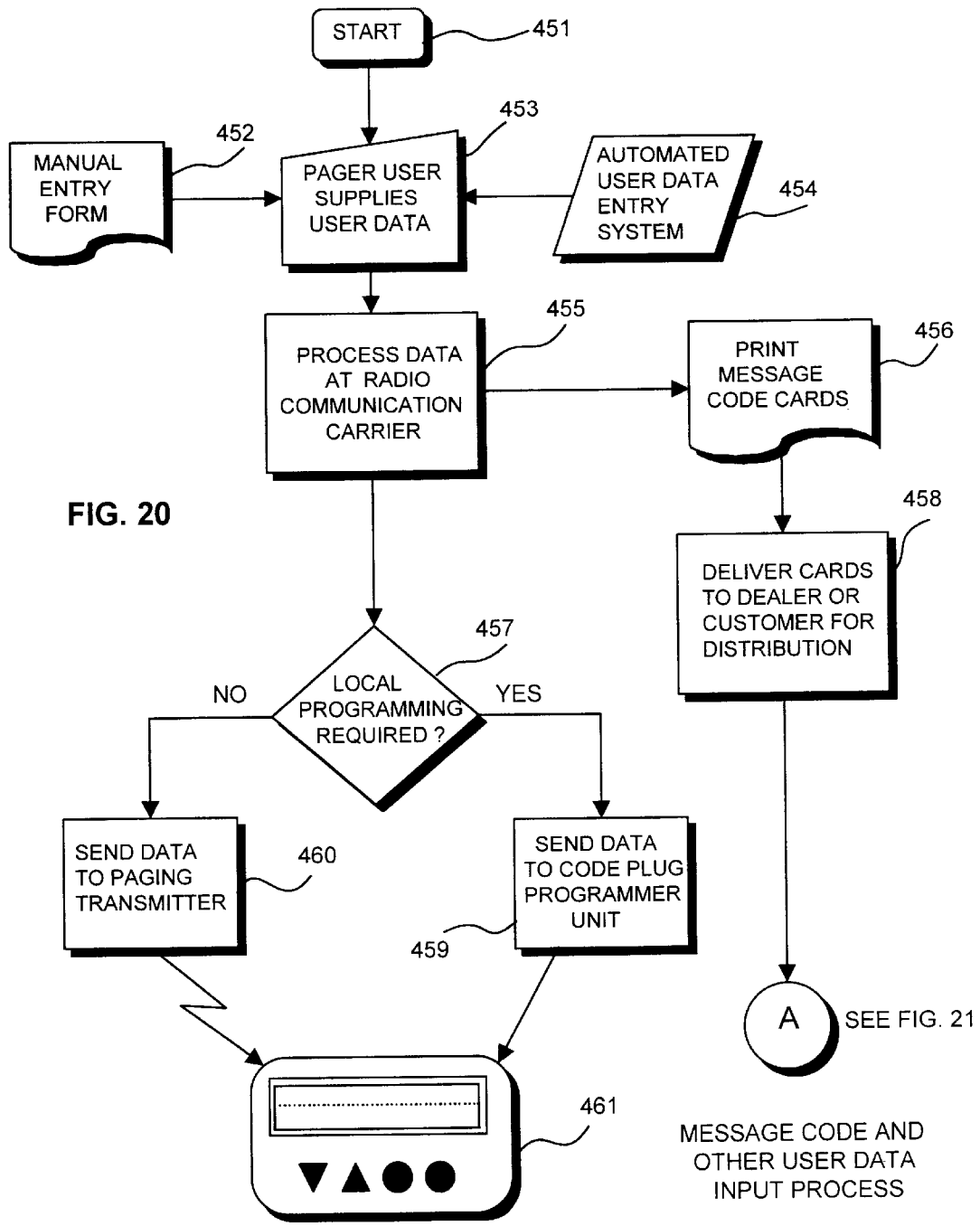
Figure 21:
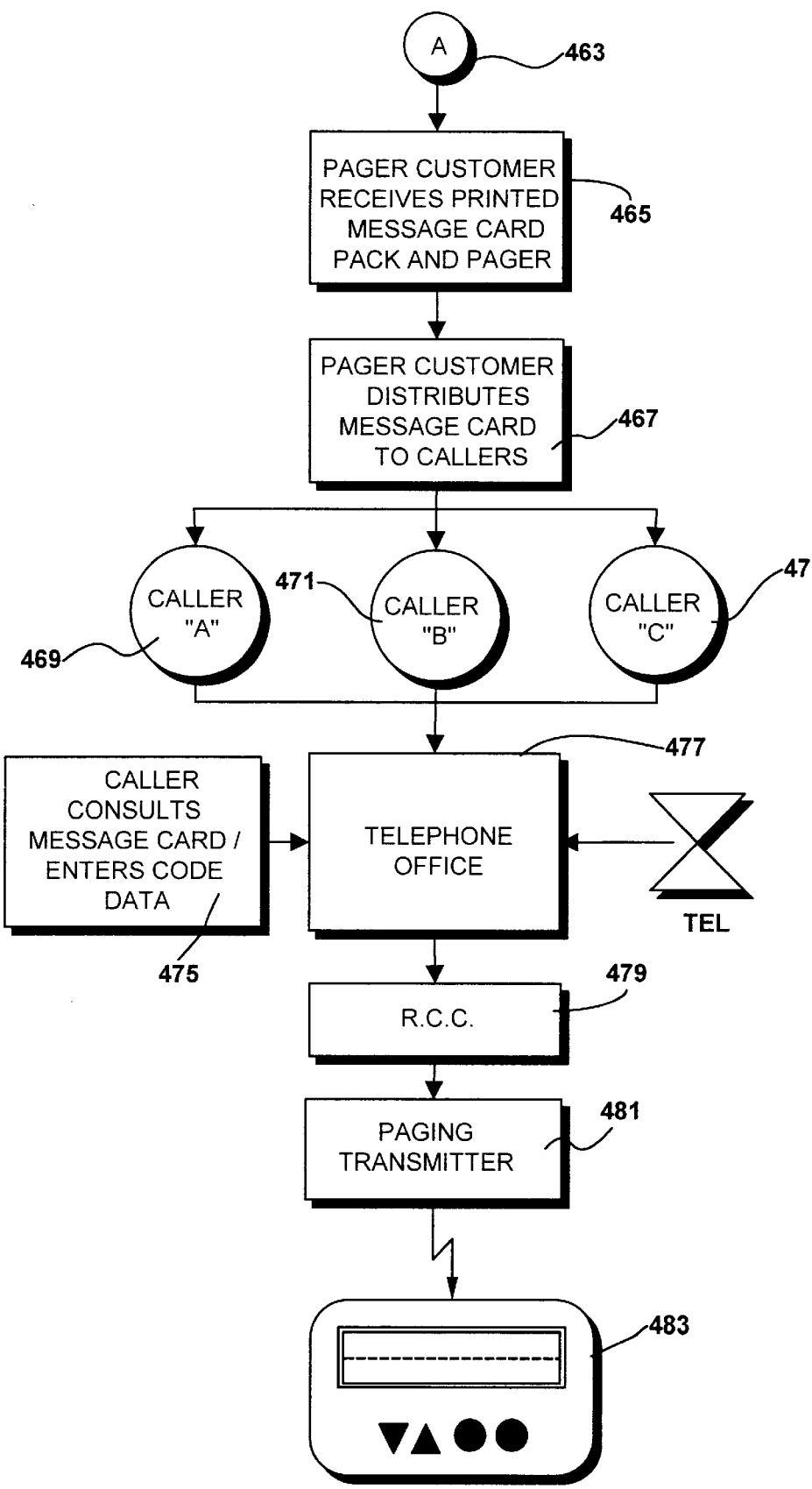

FIG. 19 depicts yet another technique for entering and modifying data which is present within the database present within the memory of the portable communication device. As is shown, the page-receiving communicant inputs data on a physical form 435, which identifies communicant's names, communicant's telephone numbers, communicant's fax numbers, communicant's addresses, and any associated notification attribute for that particular communicant. Alternatively, information is provided via an automated user input request system 437 which preferably utilizes either a portable computing device, a stationary computing device, or a telephone to input data which is to be communicated via radio common carrier 439 to paging transmitter 441, which communicates via radio frequency communication link 443 to paging receiver 445. The techniques for modifying the database are depicted in flowchart form in FIG. 20. The process starts at software block 451, and continues at software blocks 452, 453, and 454, wherein data is either manually entered or automatically entered and routed through software block 453. In accordance with software block 455, data is processed at a radio common carrier, and transmitted to software block 457, where it is determined whether local programming is required, if so, the process continues at software block 459; if not, the process continues at software block 460. In either event, data is communicated to portable communication device 461 for creation, supplementation, or modification of the database contained in memory in portable communication device 461. In accordance with the flowchart of FIG. 20, software block 465 requires that message code cards be printed, and delivered in accordance with software block 458 to a dealer or customer. The software steps associated with the utilization of these code cards is depicted in flowchart form in FIG. 21. In accordance with software block 465, the page customer receives the printed message card along with the pager at the beginning of pager service. In accordance with software block 467, the page customer distributes the message cards to callers, and instructs them to fill the data fields in the cards. In the flow of FIG. 21, the cards are distributed to callers A, B, and C in accordance with software blocks 469, 471, 473. The callers consult their message cards, and enter the code data, and transmit it through telephone office 477 to radio common carrier 479, which forwards it to paging transmitter 41, which establishes a radio frequency link with portable communication device 43.

Figure 22:
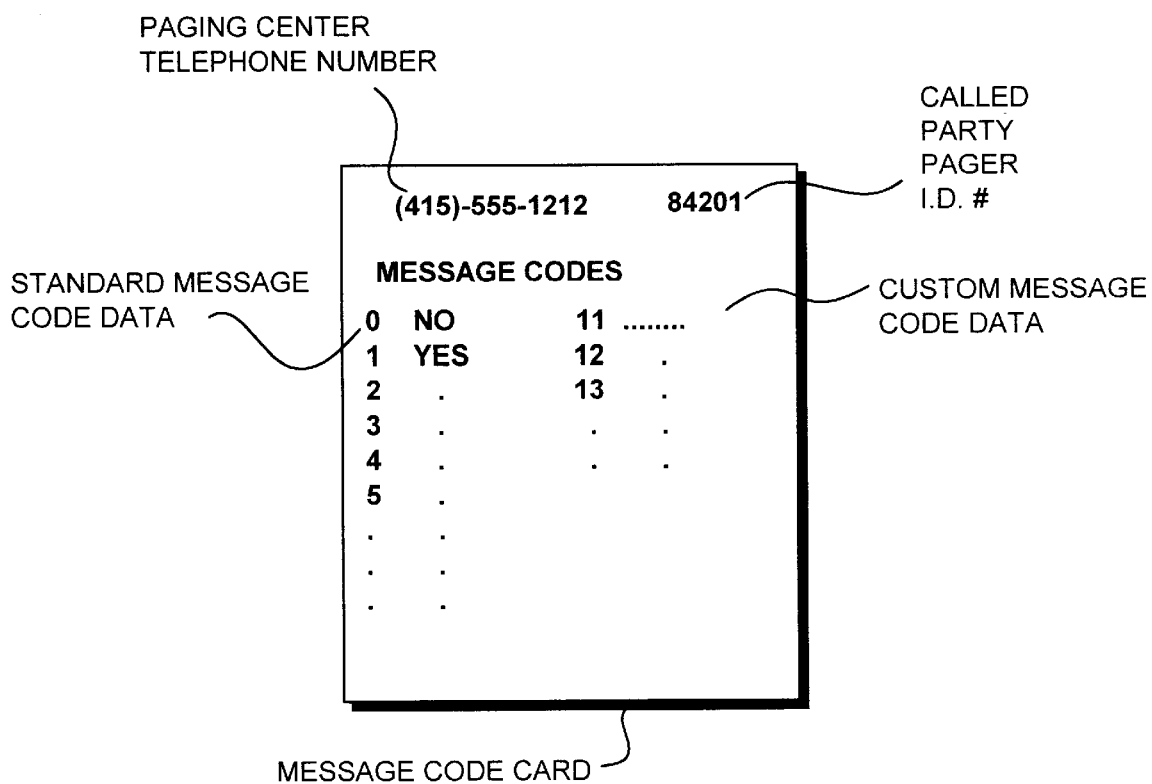

FIGS. 22 and 23 depict two types of standardized message code cards. The card of FIG. 22, the call-receiving communicant's pager ID number is identified, along with the telephone number for the paging center. Then, a plurality of numeric or alphanumeric codes are provided in a field, with an area to the right for providing numeric or alphanumeric messages which correspond to the numeric or alphanumeric codes. For example, the numeric value "0" may corresponds to the answer "no", while the numeric value "1" may correspond to the answer "yes". In the view of FIG. 23, an alternative standardized message code card is provided, which provides alphanumeric or numeric characters with alphabetic textual messages. For example, the numeric code "11" corresponds to the message "pick up the kids". Additionally, the potential communicant can enter phone data and fax data in fields which are dedicated for that purpose. This information is entered on a wide number of cards by people who are likely to communicate with the paging subscriber. They are mailed in or entered in by the potential communicants, to form a database which is periodically communicated to the page receiving apparatus.

While the invention has been shown in only one of its forms, it is not thus limited but is susceptible to various changes and modifications without departing from the spirit thereof.

What is claimed is:
1. A method of communicating information from a page-originating communicant to a page-receiving communicant utilizing a paging network which operates by generating a page after receiving a paging request from said page-originating communicant over a telephone network, comprising the method steps of:
   (a) providing a portable communication device identified in said paging network to said page-receiving communicant, said portable communication device including:
      (1) a database recorded in memory with a plurality of associated data fields, including a numeric field which is representative of telephone numbers; and
      (2) means for comparing information obtained from said paging network with at lest one of said plurality of associated data fields;
      (3) a display member for displaying at least one of (1) information obtained from said paging network, and (2) information obtained from said plurality of data fields;
   (b) initiating communication between said page-originating communicant and said numeric paging network over said telephone network;
   (c) automatically passing caller-identification information from said telephone network to said paging network, said caller-identification information including at least a bit string representation of a telephone number for a particular telephone unit utilized by said page originating communicant in making said paging request without requiring entry by said page-originating communicant of said caller-identification information;
   (d) allowing input by said page-originating communicant of optional numeric data into said paging network;
   (e) utilizing said paging network to transmit to said page-receiving communicant (1) said caller-identification information including at least a bit string representation of a telephone number for a particular telephone unit utilized by said page-originating communicant in making said paging request without requiring entry by said page-originating communicant of said caller-identification information, and (2) said optional numeric data;
   (f) receiving (1) said caller-identification information including at least a bit string representation of a telephone number for a particular telephone unit utilized by said page-originating communicant in making said paging request without requiring entry by said page-originating communicant of said caller-identification information, and (2) said optional numeric data at said portable communication device identified in said paging network to said page-receiving communicant;
   (g) utilizing said portable communication device for analyzing said caller-identification information and optional numeric data by utilizing said means for comparing which is resident in said portable communication device to compare said caller-identification information and said optional numeric data with particular ones of said plurality of associated data fields of said database recorded in memory of said portable communication device; and
   (h) displaying information in said display member of said portable communication device resulting from said step of utilizing said portable communication device.
2. A method of communicating, according to claim 1, wherein said step of utilizing said portable communication device for analyzing includes:

comparing at least one of (1) said caller-identification information and (2) said optional numeric data to at least portions of said database.

3. A method of communicating, according to claim 1, wherein said step of utilizing said portable communication device for analyzing comprises:
  comparing said caller-identification information to said telephone number field.

4. A method of communicating, according to claim 1, wherein said step of utilizing said portable communication device for analyzing includes:
  comparing said optional numeric data to said telephone number field.

5. A method of communicating, according to claim 4, further including:
  identifying matches between said optional numeric data and at least one matched data item in said telephone number field.

6. A method of communicating, according to claim 5, further including:
  displaying information contained in selected ones of said plurality of data fields which are associated with said at least one matched data item in said display member of said portable communication device.

7. A method of communicating, according to claim 6, further including:
  displaying at least a portion of said caller-identification information in said display member of said portable communication device.

8. A method of communicating, according to claim 6, wherein said information displayed in said display member provides an indication of identity of said page-originating communicant.

9. A method of communicating, according to claim 8, wherein said information displayed in said display member comprises at least one name associated in said database with said optional numeric data.

10. A method of communicating information from a page-originating communicant to a page-receiving communicant utilizing a paging network which operates by generating a page after receiving a paging request from said page-originating communicant over a telephone network, said paging request including caller-identification information, including at least a bit string representation of a telephone number for a particular telephone unit utilized by said page-originating communicant in making said paging request, comprising the method steps of:
  (a) providing a portable communication device identified in said paging network to said page-receiving communicant, said portable communication device including:
    (1) a database recorded in memory with a plurality of associated data fields, including a numeric field which is representative of telephone numbers;
    (2) means for comparing information obtained from said paging network with at least one of said plurality of associated data fields;
    (3) a display member for displaying at least one of (1) information obtained from said paging network, and (2) information obtained from said plurality of data fields;
  (b) initiating communication between said page-originating communicant and said paging network over said telephone network;
  (c) automatically passing said caller-identification information from said telephone network to said paging network;
  (d) allowing input by said page-originating communicant of optional numeric data into said paging network;
  (e) utilizing said paging network to transmit to said page-receiving communicant (1) said caller-identification information and (2) said optional numeric data;
  (f) receiving (1) said caller-identification information and (2) said optional numeric data at said portable communication device identified in said paging network to said page-receiving communicant;
  (g) utilizing said portable communication device for analyzing said caller-identification information and optional numeric data by utilizing said means for comparing which is resident in said portable communication device to compare said caller-identification information and said optional numeric data with particular ones of said plurality of associated data fields of said database recorded in memory of said portable communication device and identifying matches between said optional numeric data and at least one matched data item in said telephone number field; and
  (h) displaying information in said display member contained in selected ones of said plurality of data fields which are associated with said at least one matched data item in said display member of said portable communication device, including at least a portion of said caller-identification information in said display member of said portable communication device in over to provide an indication of identity of said page-originating communicant which includes at least one name associated in said database with said optional numeric data.

11. A method of communicating information, according to claim 10, further comprising:
  periodically updating said database recorded in memory to include new information regarding potential communicants.

12. A method of communicating information, according to claim 10, further comprising:
  including in said portable communication device a calendar with fields annotated with particular dates;
  programming said portable communication device to automatically provide prompts.

13. A method of communicating information, according to claim 10, further comprising:
  if no matched data items re uncovered after comparison, displaying information in said display member of said portable communication device which indicates that no match was found.

14. A method of communicating information, according to claim 10, further comprising:
  allowing user selection of intensity levels for page alert notification;
  providing a page alert notification upon receipt of a page in accordance with said user selection of intensity.

15. A method of communicating information, according to claim 10, further comprising:
  providing a detachable input interface;
  connecting a detachable input interface to said portable connection device;
  utilizing said detachable input interface to modify said database recorded in memory of said portable communication device.

16. A method of communicating information, according to claim 10, further comprising:

providing a means for coupling said portable communication device to a computer;

utilizing said computer to modify said database recorded in memory of said portable communication device.

17. A method of communicating information from a page-originating communicant to a page-receiving communicant utilizing a paging network which operates by generating a page after receiving a paging request from said page-originating communicant over a telephone network, comprising the method steps of:

(a) providing a portable communication device identified in said paging network to said page-receiving communicant, said portable communication device including:
  (1) a database recorded in memory with a plurality of associated data fields, including a numeric field which is representative of telephone numbers; and
  (2) means for comparing information obtained from said paging network with at least one of said plurality of associated data fields;
  (3) a display member for displaying at least one of (1) information obtained from said paging network, and (2) information obtained from said plurality of data fields;

(b) initiating communication between said page-originating communicant and said paging network over said telephone network;

(c) automatically passing said caller-identification information from said telephone network to said paging network, said caller-identification information including at least a bit string representation of a telephone number for a particular telephone unit utilized by said page-originating communicant in making said paging request without requiring entry by said page-originating communicant of said caller-identification information;

(d) allowing input by said page-originating communicant of optional data into said paging network;

(e) utilizing said paging network to transmit to said page-receiving communicant (1) said caller-identification information, including at least a bit string representation of a telephone number for a particular telephone unit utilized by said page originating communicant in making said paging request without requiring entry by said page-originating communicant of said caller-identification information, and (2) said optional data;

(f) receiving (1) said caller-identification information, including at least a bit string representation of a telephone number for a particular telephone unit utilized by said page originating communicant in making said paging request without requiring entry by said page-originating communicant of said caller-identification information, and (2) said optional data at said portable communication device identified in said paging network to said page-receiving communicant;

(g) a utilizing said portable communication device for analyzing said caller-identification information and optional data by utilizing said means for comparing which is resident in said portable communication device to compare said caller-identification information with particular ones of said plurality of associated data fields of said database recorded in memory of said portable communication device; and (h) displaying information in said display member of said portable communication device resulting from said step of utilizing portable communication device for analyzing.

18. A method of communicating, according to claim 17, wherein said step of utilizing said portable communication device for analyzing comprises:

comparing said caller-identification information to said telephone number field.

19. A method of communicating, according to claim 17, further including:

displaying information contained in selected ones of said plurality of data fields which are associated with said at least one matched data item in said display member of said portable communication device.

20. A method of communicating, according to claim 17, further including:

displaying at least a portion of said caller-identification information in said display member of said portable communication device.

21. A method of communicating, according to claim 17, wherein said optional data includes at least one of the following data types:

(a) numeric data;
(b) alphanumeric data;
(c) digitized speech;
(d) facsimile messages; and
(e) images.

* * * * *

UNITED STATES PATENT AND TRADEMARK OFFICE
CERTIFICATE OF CORRECTION

PATENT NO. : 6,427,064 B1
DATED : July 30, 2002
INVENTOR(S) : Daniel A. Henderson It is certified that error appears in the above-identified patent and that said Letters Patent is hereby corrected as shown below:

Title page, Item [54] and Column 1, lines 1-4,
Title, change to -- METHOD OF AUTOMATICALLY COMMUNICATING CALLER-IDENTIFICATION INFORMATION OR OPTIONAL DATA THROUGH A PAGING NETWORK TO A PORTABLE COMMUNICATION DEVICE --.

Title page,
Item [75], Inventors, change the address of the Inventor to -- 108 Dustin Circle, Weatherford, Texas 76087 --.
Item [56], References Cited, U.S. PATENT DOCUMENTS, change the inventor's name on U.S. Patent No. 4,868,860 from "Anddros et al." to -- Andros --.
Change the inventor's name on U.S. Patent No. 4,994,797 from "Breeder" to -- Breeden --.
Change the title of the Motorola product brochure from "Macro Wireless Communicator" to -- Marco Wireless Communicator --.
Change the title of the Newsbytes News Network article from "PageCard to double as PCMCCard/Standalone pager" to -- PageCard to double as PCMCIA/Standalone pager --.
Change the magazine title from "PC Laptop Compters Magazine" to -- PC Laptop Computers Magazine --.
Item [57], ABSTRACT,
Replace the ABSTRACT with the following:
-- A method is provided for communicating information from a page-originating communicant over a paging network to a portable communication device. When communication between the page-originating communicant and the paging network is initiated, caller-identification information is automatically passed to the paging network. The page-originating communicant is allowed an opportunity to input an optional data. The paging network transmits the caller identification information or the optional data to the portable communication device. --

Column 16,
Line 42, change "caller-identification information, and (2) said optional" to -- caller-identification information, or (2) said optional --.
Line 50, change "information, and (2) said optional numeric" to -- information, or (2) said optional numeric --.
Line 54, change "said caller-identification information and" to -- said caller-identification information or --.
Line 58, change "information and said optional" to -- information or said optional --.

UNITED STATES PATENT AND TRADEMARK OFFICE
CERTIFICATE OF CORRECTION

PATENT NO. : 6,427,064 B1
DATED : July 30, 2002
INVENTOR(S) : Daniel A. Henderson It is certified that error appears in the above-identified patent and that said Letters Patent is hereby corrected as shown below:

Column 17,
Line 2, change "information and (2) said optional" to -- information or (2) said optional --.

Column 18,
Line 5, change "information and (2) said optional" to -- information or (2) said optional --.
Lines 7 and 12, change "caller-identification information and" to -- caller-identification information or --.
Line 16, change "information and said optional numeric data" to -- information or said optional numeric data --.
Line 20, change "between said optional numeric data" to -- between said caller-identification information or optional numeric data --.
Line 27, change "caller-identification information in said display" to -- caller-identification information or optional numeric data in said display --.
Line 28, change "in over" to -- in order --.
Line 31, change "said optional" to -- said caller identification information or said optional --.
Line 60, change "connection" to -- communication --.

Signed and Sealed this

Twenty-ninth Day of June, 2004

JON W. DUDAS
*Acting Director of the United States Patent and Trademark Office*